United States Patent
Yao et al.

(10) Patent No.: US 7,127,714 B2
(45) Date of Patent: *Oct. 24, 2006

(54) DATA TRANSFER REQUEST PROCESSING SCHEME FOR REDUCING MECHANICAL ACTIONS IN DATA STORAGE SYSTEM

(75) Inventors: Hiroshi Yao, Kanagawa (JP); Tatsunori Kanai, Kanagawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 146 days.

This patent is subject to a terminal disclaimer.

(21) Appl. No.: 10/930,870

(22) Filed: Sep. 1, 2004

(65) Prior Publication Data

US 2005/0027936 A1 Feb. 3, 2005

Related U.S. Application Data

(63) Continuation of application No. 09/534,055, filed on Mar. 24, 2000, now Pat. No. 6,802,064.

(30) Foreign Application Priority Data

Mar. 26, 1999 (JP) .................................. 11-083628

(51) Int. Cl.
*G06F 9/46* (2006.01)
(52) U.S. Cl. .................. 718/102; 710/40; 711/112; 711/167
(58) Field of Classification Search ........ 718/100–103, 718/107; 719/310, 319; 709/231, 232; 710/6, 710/33, 44, 40; 711/112, 151, 158, 167; 370/230.1
See application file for complete search history.

(56) References Cited

U.S. PATENT DOCUMENTS 4,325,120 A * 4/1982 Colley et al. ............... 711/202

(Continued)

FOREIGN PATENT DOCUMENTS

EP 0 757 310 2/1997

(Continued)

OTHER PUBLICATIONS

Reddy "Real-Time Communication Scheduling in a Multicomputer Video Server", 1999, pp. 425-445.*

(Continued)

*Primary Examiner*—William Thomson
*Assistant Examiner*—Van Nguyen
(74) *Attorney, Agent, or Firm*—Oblon, Spivak, McClelland, Maier & Neustadt, P.C.

(57) ABSTRACT

There are two classes of scheduling policy: a first class in which a completion of data transfer requested by a data transfer request within a deadline for completing the requested data transfer, specified for the request, is a primary key factor in determining an order of processing, and a second class in which a reduction of amounts of mechanical actions of a storage device required in carrying out the data transfer requested by the request is a primary key factor in determining the order of processing. Data transfer requests with respect to the storage device are sequentially accepted. Each data transfer request is classified into the second class while the current time has not yet exceeded a time earlier by a certain time than the deadline. Each data transfer request is classified into the first class after the current time has already exceeded the time.

26 Claims, 11 Drawing Sheets

U.S. PATENT DOCUMENTS

| | | | |
|---|---|---|---|
| 5,220,653 A | | 6/1993 | Miro |
| 5,442,730 A | | 8/1995 | Bigus |
| 5,721,950 A | * | 2/1998 | Tobagi et al. ............... 710/6 |
| 5,761,417 A | * | 6/1998 | Henley et al. ............ 709/231 |
| 5,787,482 A | | 7/1998 | Chen et al. |
| 5,826,081 A | * | 10/1998 | Zolnowsky ............... 718/103 |
| 5,974,503 A | | 10/1999 | Venkatesh et al. |
| 6,028,843 A | * | 2/2000 | Delp et al. ................ 370/235 |
| 6,078,998 A | * | 6/2000 | Kamel et al. ............. 711/151 |
| 6,085,215 A | * | 7/2000 | Ramakrishnan et al. .... 718/102 |
| 6,088,734 A | * | 7/2000 | Marin et al. ............... 709/232 |
| 6,343,351 B1 | * | 1/2002 | Lackman et al. .......... 711/158 |
| 6,378,036 B1 | * | 4/2002 | Lerman et al. ............ 711/112 |
| 6,532,213 B1 | * | 3/2003 | Chiussi et al. ........... 370/230.1 |
| 6,779,182 B1 | * | 8/2004 | Zolnowsky ............... 718/103 |
| 6,802,064 B1 | * | 10/2004 | Yao et al. ................. 718/102 |

FOREIGN PATENT DOCUMENTS

| | | |
|---|---|---|
| JP | 10-333954 | 12/1996 |
| WO | WO 98/45780 | 10/1998 |

OTHER PUBLICATIONS

Shih et al "Modified Rate-Monotonic Algorithm for Scheduling Periodic Jobs with Deferred Deadlines", 1993 IEEE, pp. 1171-1179.*

Xu et al "Scheduling Processes with Release Times, Deadlines, Precedence, and Exclusion Relations", 1990 IEEE, pp. 360-369.*

Chetto et al "Some Results of the Ealiest Deadline Scheduling Algorithm", 1989 IEEE, pp. 1261-1269.*

Ramamritham et al "Distributed Scheduling of Tasks with Deadlines and Resource requirements", 1989 IEEE, pp. 1110-1123.*

Siu-Wah Lau, et al. "Scheduling and Replacement Policies for a Hierarchical Multimedia Storage Server," Proc. of Multimedia Japan 96, 1996, pp. 68-75.

Tatsuo Mori, et al. "Video-on-Demand System Using Optical Mass Storage System," Jpn. J. Appl. Physl, vol. 32, Nov. 1993, pp. 5433-5438.

Y. Rompogiannakis, et al., Proceedings of the ACM Multimedia, vol. 6, pp. 297-302, "Disk Scheduling for Mixed-Media Workloads in a Multimedia Server", 1998.

* cited by examiner

CONVENTIONAL SCHEME USING TWO BUFFERS

CONVENTIONAL SCHEME USING TWO BUFFERS,
TWICE LARGE TRANSFER DATA AMOUNT & TWICE LONGER PERIOD

PRESENT INVENTION SCHEME USING FOUR BUFFERS

DATA TRANSFER REQUEST PROCESSING SCHEME FOR REDUCING MECHANICAL ACTIONS IN DATA STORAGE SYSTEM

CROSS-REFERENCE TO RELATED APPLICATIONS

This application is a Continuation of U.S. patent application Ser. No. 09/534,055, filed Mar. 24, 2000, now U.S. Pat. No. 6,802,064, issued Oct. 5, 2004, and claims priority to Japanese Patent Application No. 11-083628, filed Mar. 26, 1999. The contents of the U.S. patent application Ser. No. 09/534,055 are incorporated herein by reference.

BACKGROUND OF THE INVENTION

1. Field of the Invention

The present invention relates to a control scheme of a request processing device for processing data transfer requests issued to a storage device that requires large mechanical actions such as a media exchanger.

2. Description of the Background Art

In general, data transfer requests issued to a storage device are entered into queues once and then processed in an order according to a scheduling policy specific to that storage device. Policies often used as the scheduling policy of the storage device include FIFO (First In First Out) and SCAN. FIFO is a policy for processing requests in an order of issue times of requests, whereas SCAN is a policy specific to a disk device in which a moving direction of a head is restricted to one direction, and requests are processed in such an order that a request that accesses a closest track in that direction is processed first.

However, in the storage device incorporated within a real time system, there are cases where a deadline is set for a processing of each data transfer request. In such cases, the scheduling policy called EDF (Earliest Deadline First) is often employed. This is a policy in which requests are processed in such an order that a request with the earliest deadline is processed first.

Also, in the case of handling a series of data transfer requests that should be processed periodically, it is possible to employ a policy called RM (Rate Monotonic). Each request sequence to be handled by RM has its unique period, such that one request is issued and processed within one period. RM is a policy in which a plurality of request sequences are handled simultaneously in such an order that a request belonging to a sequence with a shortest period is processed first.

FIFO is used in cases where a response time for a request is important, and SCAN is used in cases where an overall transfer performance is important. On the other hand, EDF or RM is often used in cases where there is a need to guarantee that a processing of each periodic data transfer request will be completed within its period. However, even in such cases, FIFO or SCAN can be used if a special condition that all data transfer requests have an equal period holds.

Here, in the case of using tapes as a storage medium that is a target of data transfer or the case of using a plurality of storage media while exchanging them by a media exchanger, an overhead in the case of random accesses becomes very large. For this reason, the transfer efficiency becomes poor because the overhead time until the start of the data transfer becomes relatively longer than the time required for actually transferring data. In addition, the amount of actions by mechanical parts is large so that there is a need to take the durability of the mechanical parts into consideration.

As a scheme for carrying out the data transfer in the storage device using tapes or a media exchanger, the following schemes have been proposed so far.

(1) A data transfer with deadline is not handled. Namely, the time division multiple access using a policy that can guarantee deadlines such as EDF or RM is abandoned, and a policy that can reduce the number of tape movements or media exchanges such as SCAN is employed.

(2) A data transfer with deadline is not handled in the case of carrying out the time division multiple access that requires media exchanges. Namely, while the data transfer with deadline is to be carried out for some file, a medium that stores this file is left in a drive while this file is in use. However, in this scheme, in order to access a file stored in another medium, it is necessary to wait for the end of the use of the currently used file.

(3) The time division multiple access using a policy that can guarantee deadlines such as EDF or RM is simply carried out. In this scheme, it is possible to handle data transfer with deadline, but the scheduling for reducing the number of tape movements or media exchanges is impossible.

(4) An amount of data transfer is increased in the case of carrying out the time division multiple access using EDF or RM. Since the transfer time and the transfer period become longer in proportion to the data transfer amount, it is possible to relatively reduce the number of tape movements or media exchanges, but the wait time also becomes longer in proportion to the data transfer amount in this scheme.

Note that there also exists a scheme which has a superior random access performance than tapes or a media exchanger and which uses a cache disk in a form of a hard disk whose capacity can be increased beyond that of a memory. In the case of actually carrying out the periodic data transfer using a cache disk, it is customary to use a scheme in which all files with high utilization frequencies are cached into the cache disk and the time division multiple access is permitted only for those files which are entirely cached in the cache disk. As for those files which are not cached in the cache disk, any one of the four schemes described above have to be employed.

As described, according to the conventional schemes, in the case of carrying out the periodic data transfer from the storage device using tapes or a media exchanger, it has been unavoidable to increase the wait time until the periodic data transfer starts when a scheme for reducing the amount of mechanical actions is employed.

SUMMARY OF THE INVENTION

It is therefore an object of the present invention to provide a data transfer request processing scheme which is capable of: (a) scheduling the processing order of the data transfer requests such that the amount of mechanical actions can be reduced, by taking the durability of the mechanical parts in consideration, in the case of using storage media that requires a large amount of actions by the mechanical parts at a time of access such as a media exchanger; (b) guaranteeing that a processing of each request will be completed before its deadline in the case of handling data transfer request to be processed periodically; and (c) shortening the wait time until the data transfer starts (i.e., not increasing the amount of transfer data and the period for each request) in the case of handling data transfer requests to be processed periodically.

According to one aspect of the present invention there is provided a method for processing data transfer requests with respect to a storage device that requires mechanical actions in carrying out data transfers, comprising the steps of: classifying data transfer requests with deadlines for completing requested data transfers into first and second classes; scheduling processing of first class data transfer requests that are classified as the first class by the classifying step according to a first scheduling policy in which a completion of data transfers requested by the data transfer requests within the deadlines specified for the data transfer requests is a primary key factor in determining an order of processing, and scheduling processing of second class data transfer requests that are classified as the second class by the classifying step according to a second scheduling policy in which a reduction of amounts of the mechanical actions required in carrying out data transfers requested by the data transfer requests is a primary key factor in determining an order of processing; and processing the data transfer requests according to a scheduling result obtained by the scheduling step so as to control the storage device to carry out data transfers requested by the data transfer requests.

According to another aspect of the present invention there is provided a data transfer request processing device for processing data transfer requests with respect to a storage device that requires mechanical actions in carrying out data transfers, comprising: a classifying unit configured to classify data transfer requests with deadlines for completing requested data transfers into first and second classes; a scheduling unit configured to schedule processing of first class data transfer requests that are classified as the first class by the classifying unit according to a first scheduling policy in which a completion of data transfers requested by the data transfer requests within the deadlines specified for the data transfer requests is a primary key factor in determining an order of processing, and to schedule processing of second class data transfer requests that are classified as the second class by the classifying unit according to a second scheduling policy in which a reduction of amounts of the mechanical actions required in carrying out data transfers requested by the data transfer requests is a primary key factor in determining an order of processing; and a processing unit configured to process the data transfer requests according to a scheduling result obtained by the scheduling unit so as to control the storage device to carry out data transfers requested by the data transfer requests.

According to another aspect of the present invention there is provided a computer usable medium having computer readable program codes embodied therein for causing a computer to function as a data transfer request processing device for processing data transfer requests with respect to a storage device that requires mechanical actions in carrying out data transfers, the computer readable program codes include: a first computer readable program code for causing said computer to classify data transfer requests with deadlines for completing requested data transfers into first and second classes; a second computer readable program code for causing said computer to schedule processing of first class data transfer requests that are classified as the first class by the first computer readable program code according to a first scheduling policy in which a completion of data transfers requested by the data transfer requests within the deadlines specified for the data transfer requests is a primary key factor in determining an order of processing, and to schedule processing of second class data transfer requests that are classified as the second class by the first computer readable program code according to a second scheduling policy in which a reduction of amounts of the mechanical actions required in carrying out data transfers requested by the data transfer requests is a primary key factor in determining an order of processing; and a third computer readable program code for causing said computer to process the data transfer requests according to a scheduling result obtained by the second computer readable program code so as to control the storage device to carry out data transfers requested by the data transfer requests.

According to another aspect of the present invention there is provided a data storage system, comprising: a storage device that requires mechanical actions in carrying out data transfers; a classifying unit configured to classify data transfer requests with deadlines for completing requested data transfers into first and second classes; a scheduling unit configured to schedule processing of first class data transfer requests that are classified as the first class by the classifying unit according to a first scheduling policy in which a completion of data transfers requested by the data transfer requests within the deadlines specified for the data transfer requests is a primary key factor in determining an order of processing, and to schedule processing of second class data transfer requests that are classified as the second class by the classifying unit according to a second scheduling policy in which a reduction of amounts of the mechanical actions required in carrying out data transfers requested by the data transfer requests is a primary key factor in determining an order of processing; and a processing unit configured to process the data transfer requests according to a scheduling result obtained by the scheduling unit so as to control the storage device to carry out data transfers requested by the data transfer requests.

Other features and advantages of the present invention will become apparent from the following description taken in conjunction with the accompanying drawings.

DETAILED DESCRIPTION OF THE PREFERRED EMBODIMENTS

Referring now to FIG. 1 to FIG. 14, the preferred embodiments of a data transfer request processing scheme according to the present invention will be described in detail.

First, with reference to FIG. 1, an outline of the data transfer request processing scheme of the present invention will be described.

Figure 1:
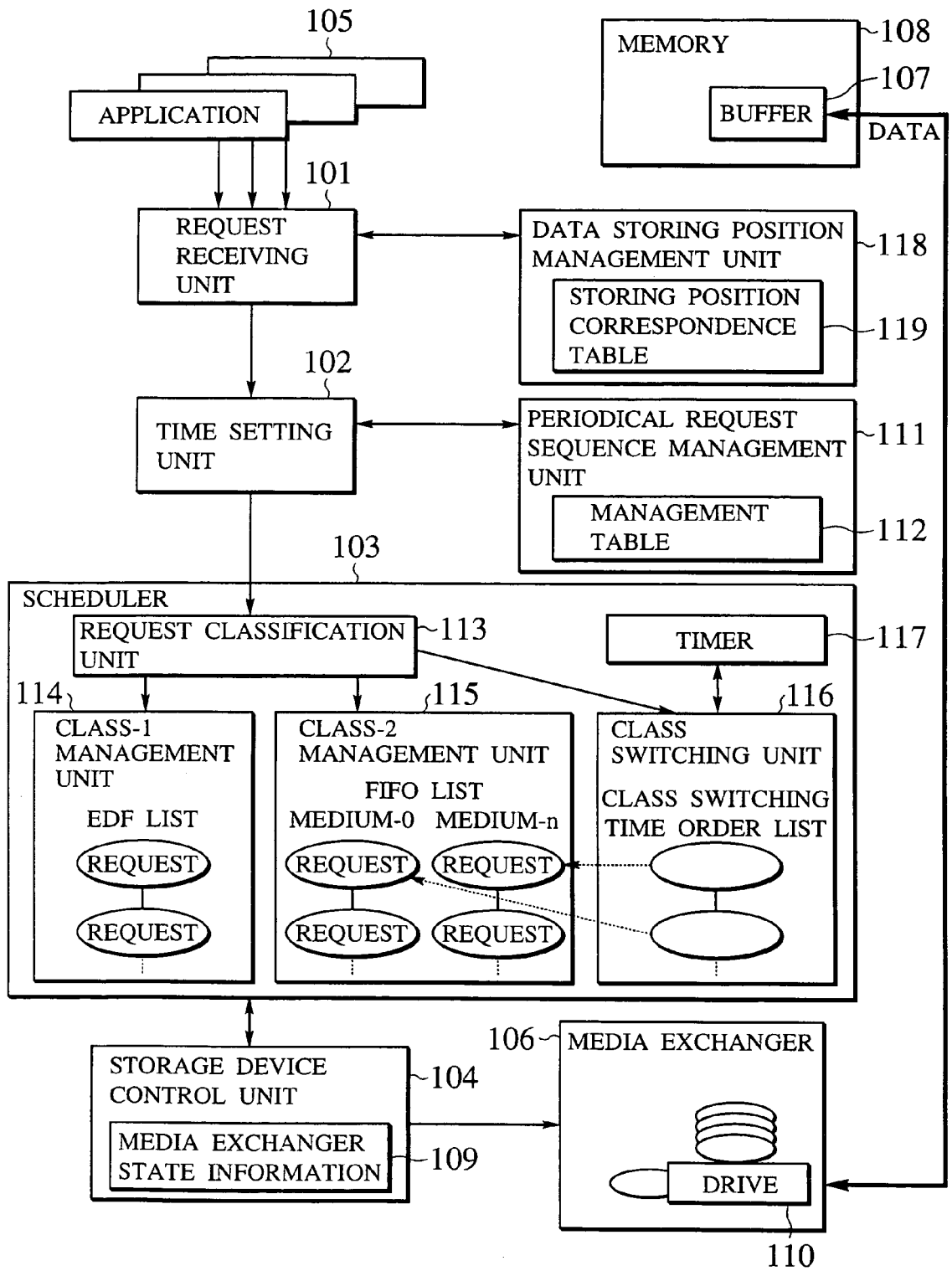
FIG. 1 is a block diagram showing an exemplary configuration of a data storage system incorporating a data transfer request processing device according to one embodiment of the present invention.

As shown in FIG. 1, a data transfer request processing device according to one embodiment of the present invention generally comprises a request receiving unit 101, a time setting unit 102, a scheduler 103, and a storage device control unit 104.

The request receiving unit 101 plays a role of an interface for receiving data transfer requests from applications 105 that are operating on a system that utilizes this data transfer request processing device.

In each data transfer request, a storing position on a storage device 106 of data to be transferred, and an address of a buffer 107 for storing data to be transferred are described, similarly as in a request for a conventional storage device. Here, when the data transfer request is a request for reading, the storage device 106 is a transfer source and the buffer 107 is a transfer destination, whereas when the data transfer request is a request for writing, the buffer 107 is a transfer source and the storage device 106 is a transfer destination. In addition, in this embodiment, a deadline of this data transfer request is specified within this data transfer request.

The time setting unit 102 refers to the data transfer request received from the request receiving unit 101 and sets a time earlier than the deadline of this request as a class switching time. The class switching time is a time at which this data transfer request should be switched from a state of belonging to a class-2 to a state of belonging to a class-1, where class-1 and class-2 are classes for scheduling data transfer requests according to different policies as will be described below (if the class switching time set here is a past time in comparison with the current time, such a data request will belong to the class-1 from the beginning).

The scheduler 103 compares the current time and the class switching time when the data transfer request for which the class switching time is set is received from the time setting unit 102, and classifies the data transfer request as either class-1 when the current time already exceeds the class switching time, or class-2 otherwise. Thereafter, the scheduler 103 continues to monitor the class switching time of the request that is classified as class-2, and raises the request to class-1 when the current time exceeds the class switching time.

The scheduler 103 also selects requests classified as class-1 at higher priority than requests classified as class-2. Priority orders among requests classified into the same class are determined according to a scheduling policy adopted for each class. In this way, a request with the highest priority level that is judged as executable according to the scheduling policy of each class is selected and a command is issued to the storage device control unit 104 according to the selected data transfer request.

The storage device control unit 104 issues control commands necessary in processing the highest priority data transfer request selected by the scheduler 103 to the storage device 106 according to a command from the scheduler 103. The control commands include not only a data transfer command but also command for moving a storage medium in a media exchanger and the like. By these control commands, the data are transferred between the storage device 106 and a buffer 107 within a memory 108 of a system that utilizes this data transfer request processing device.

Note that a difference between the deadline and the class switching time may not necessarily take a fixed value. It is also possible for the time setting unit 102 to set the class switching time according to another information related to individual data transfer request. For example, in the case where it is known in advance that individual data transfer request will be issued periodically, it is possible to set that period as a difference between the deadline and the class switching time.

Also, the case where the finishing of a processing before the deadline alone is important and the case where a response time is also important can be distinguished for individual data transfer request such that a request for which a response time is important will be classified as class-1 from the beginning by setting the class switching time at the current time.

Each request classified as class-1 is a request for which the class switching time has already past and the deadline is relatively close. Consequently, as a scheduling policy to be adopted by the scheduler 103 for class-1, it is preferable to employ a policy that uses information related to time as a primary key factor in determining the processing order such as EDF or RM (a policy in which the completion of a processing of each request before its deadline is guaranteed, a policy which gives a higher priority to the completion of a processing of each request before its deadline than the reduction of an amount of mechanical actions, etc). At least, this policy should preferably be not a policy in which some requests may be kept waiting forever depending on a state of the storage device.

On the other hand, each request classified as class-2 is a request for which the deadline is not close, and which will be raised to class-1 when the class switching time is past as the time elapses. Consequently, as a scheduling policy to be adopted by the scheduler 103 for class-2, it is acceptable to employ a policy in which some requests may be kept waiting forever. For this reason, in the present invention, a scheduling policy that refers to information regarding a state of the storage device (a current access position of a tape, an identifier of a medium currently mounted on a drive 110 of a media exchanger, etc) and uses an amount of mechanical actions required in processing each request as a primary key factor in determining the processing order (a policy for reducing at least one of an amount of movement of a storage medium (an amount of rewinding of a tape, for example), an amount of movement of a head to access the storage medium, and the number of media exchanges, a policy that gives a higher priority to the reduction of these things than the quick processing of the request, etc) is employed for class-2.

Note that each element described above (and below) may be provided in a form of software, or a combination of software and hardware. It is also possible to realize the data transfer request processing device of this embodiment by installing a program for realizing functions of each element as described above into a general purpose computer.

In the case of using a media exchanger as the storage device 106, there are needs for exchanges of storage media in order to mount an appropriate storage medium that is a target of the data transfer request onto the drive 110. The amount of movement of a storage medium and mechanical parts for conveying the storage medium is very large compared with the other mechanical parts within the storage device 106 (such as a head of an optical disk device, for example). In particular, the durability of the mechanical parts for conveying media can be problematic.

For this reason, in this embodiment, the scheduling policy for class-2 is provided with a function for making a judgement such that the data transfer request that requires a media exchange is not processed (or processed later). To this end, the storage device control unit 104 manages the state of the drive 110 of the media exchanger and maintains a media exchanger state information 109 that can be referred from the scheduler 103 in order to judge whether a storage medium is inserted in that drive or not and obtain a medium number of that medium if the medium is inserted.

At a time of selecting the executable data transfer request among requests classified as class-2, the scheduler 103 judges and selects only those data transfer requests whose targets are a storage medium inserted in the drive at that moment as executable. In this way, even when the drive is in an idling state and there are some requests classified as class-2, these requests will not be selected as long as a storage medium which is a target of these requests is not inserted in the drive.

As a result, the data transfer request will be classified as class-2 until its class switching time is reached, and scheduled such that the number of storage media exchanges will be reduced. When the class switching time is past, the request is raised to class-1, and scheduled according to time such as its deadline as a key, rather than the reduction of the number of storage media exchanges.

In this embodiment, it is also possible to provide a function for processing the data transfer request received from an application by dividing it into a plurality of partial requests. In general, once the data transfer with respect to the storage device is started, it is difficult to interrupt this data transfer and execute another transfer request instead. For this reason, when the transfer amount specified by the data transfer request exceeds a certain fixed unit amount, such a data transfer request can be divided into a plurality of partial requests such that the transfer amount of each partial request does not exceed the unit amount. Using this function, it becomes possible to keep an opportunity for interruption whenever the data transfer in the unit amount is carried out, even for the data transfer request processing which normally cannot be interrupted. Note that this request dividing function can be realized at any of the request receiving unit 101, the time setting unit 102, or the scheduler 103.

The storage media include those for which the data transfer rate is largely different for the reading and the writing. For example, in the case of writing into the magneto-optical disk, there are some magneto-optical disks that require the three step processing of deleting old data, recording new data, and verifying recorded data. In this case, the time required in writing data is three times longer than the case of reading data of the same size. In such a case, it is convenient to use the above described request dividing function. Namely, in the case of writing, the request is divided by setting the unit amount to be ⅓ of the unit amount for the reading. In this way, the transfer time for the unit amount of writing and the transfer time for the unit amount of reading can be made to appear equal.

The buffer 107 for storing data read out from the storage device in response to the data transfer request or for storing data to be written into the storage device is normally provided on the memory 108, and referred by its address in the data transfer request. However, in the case of using the media exchanger or the like as the storage device 106, it is possible to provide a cache formed by a hard disk or the like in order to cover the overhead due to access to such a storage device. Then, when the required buffer capacity is large, the buffer 107 can be provided on the cache hard disk which has a larger capacity than the memory and the above described operation can be carried out with respect to this buffer 107.

Next, the case of applying the present invention to a system that handles data transfer requests to be processed periodically will be described.

Here, the data transfer requests to be processed periodically are requests of a consecutive data transfer request sequence for which respective deadlines are set at interval of a period specific to that sequence. In the following, a sequence formed by a plurality of such data transfer requests will be simply referred to as "periodical request sequence".

For example, in an application in which data sequentially read out in units of a certain fixed size from the storage device are to be consumed at a constant rate, it is necessary to read out a next data before a current data is completely consumed and a consumption of a next data begins. A time required in consuming data in a certain fixed size is a constant, so that a time at which a consumption of individual data begins, that is the deadline of individual data transfer request, comes at a constant period.

In general, in the case of processing periodically generated requests by the scheduling policy such as RM or EDF, it is presupposed that each request is issued at a start timing of each period and the deadline of that request is set at an end timing of that period (that is, the relative deadline is set equal to the period). This is because a scheduling feasibility test (to be described below) for judging whether it is possible to guarantee the deadline of each request for a series of requests to be processed periodically can be applied relatively easily to RM and EDF under such a presupposition.

Figure 2:
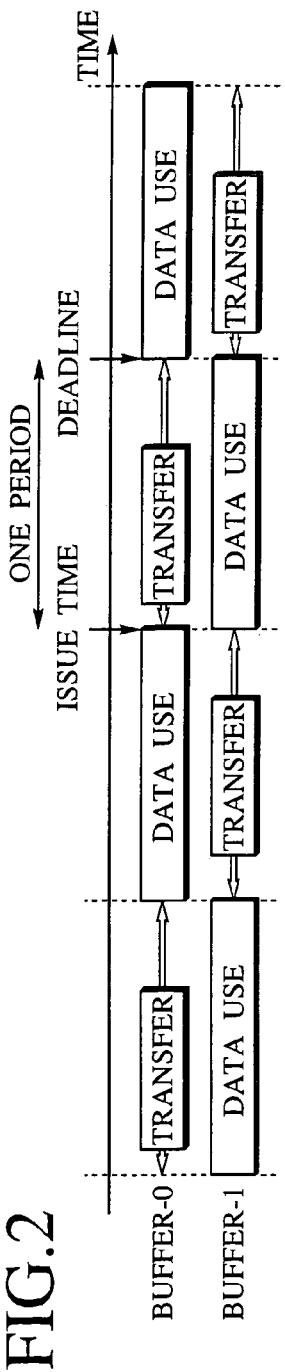
FIG. 2 is a timing chart showing an exemplary buffer utilization in the case of using two buffers in the data storage system of FIG. 1.

As an exemplary case that satisfies the above presupposition, there is a case in which double buffers are provided and a buffer for carrying out the data transfer request processing and a buffer from which the application uses data are switched at interval of one period, as shown in FIG. 2. In FIG. 2, double line bidirectional arrows indicate a time period between the issue time and the deadline of each data transfer request.

Figure 3:
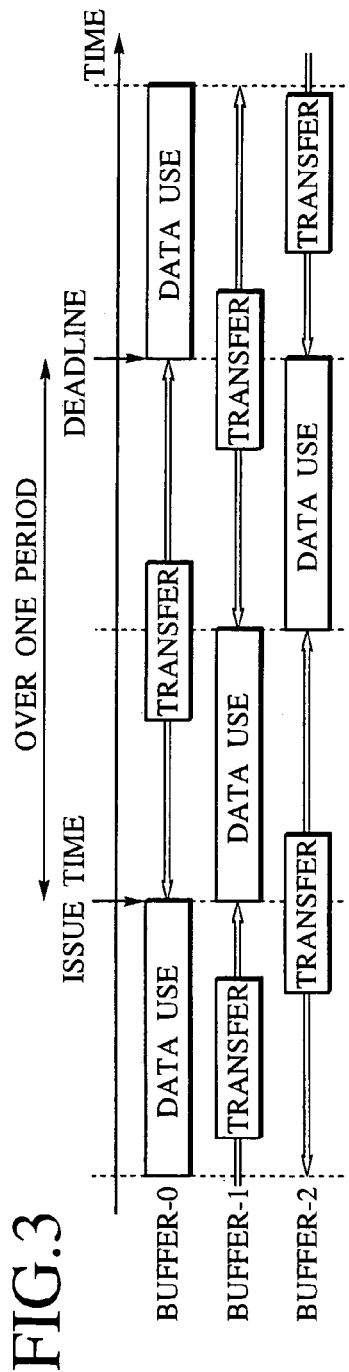
FIG. 3 is a timing chart showing an exemplary buffer utilization in the case of using more than two buffers in the data storage system of FIG. 1.

However, when more than two buffers are available as shown in FIG. 3, it is possible to issue/process the data transfer requests before a time prior to the deadline by one period time.

Figure 4:
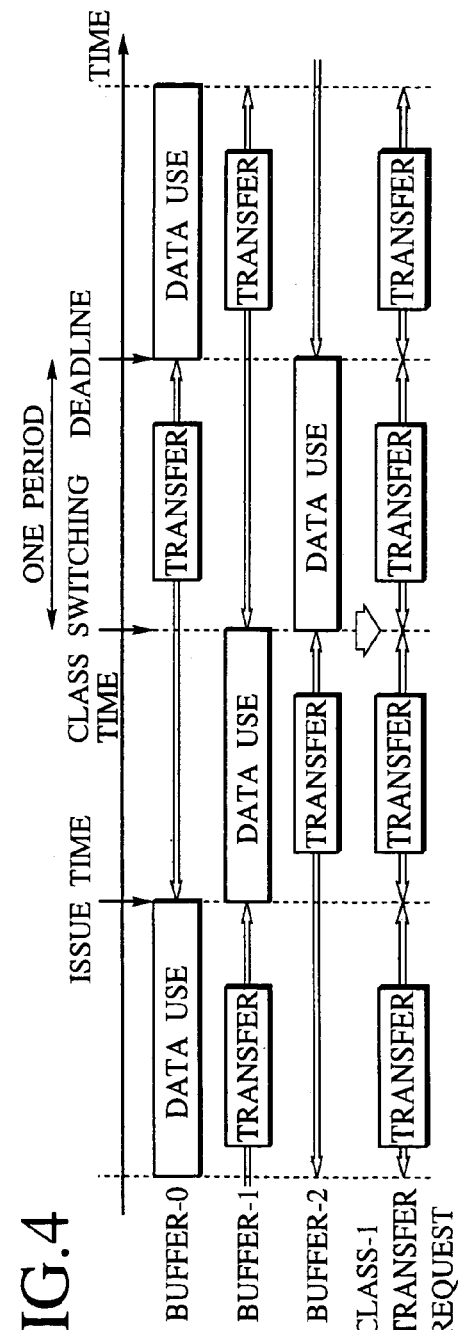
FIG. 4 is a timing chart showing a processing of class-1 data transfer requests in the case of setting a time difference between a deadline and a class switching time equal to one period in the data storage system of FIG. 1.

For this reason, in this embodiment, the time setting unit 102 is provided with a function for setting the class switching time at a time prior to the deadline by one period time. In this way, even in the case as shown in FIG. 3, all the requests to be classified as class-1 will be registered as class-1 at a start timing of each period and the deadline will be set at an end timing of that period, as shown in FIG. 4. Consequently, it becomes possible to process the periodical request sequence by adopting RM or EDF as the scheduling policy for class-1.

In order to adopt RM as the scheduling policy for class-1, the scheduler 103 can be provided with a function for selecting the data transfer requests to be classified as class-1 in an increasing order of their periods.

In order to adopt EDF as the scheduling policy for class-1, the scheduler 103 can be provided with a function for selecting the data transfer requests to be classified as class-1 in an increasing order of their deadlines.

In the case where the application specifies the deadline of individual data transfer request, it is possible that the application erroneously sets the deadline at a time earlier than what is appropriate for that periodical request sequence. When one application makes a mistake of this kind, the adverse effect can be caused on the operation of the other periodical request sequences as well.

In such a case where the request issue timing or the deadline specified by the application cannot be trusted, it is possible to provide a periodical request sequence management unit 111 in the data transfer request processing device of this embodiment instead of allowing the application to specify the deadline of individual request. This periodical request sequence management unit 111 manages a period of each periodical request sequence and determines the class switching time and the deadline for each data transfer request, using a management table 112. The time setting unit 102 refers to these class switching time and deadline determined by the periodical request sequence management unit 111, and sets the class switching time and the deadline for the data transfer request belonging to that sequence.

In addition, the periodical request sequence management unit 111 may also be provided with a function for checking whether all the requests can be processed completely within their respective deadlines or not when the application 105 registers the periodical request sequence into the periodical request sequence management unit 111, and refuses the registration if the completion of a processing of all the requests within their respective deadlines cannot be guaranteed.

In order to realize this function, the scheduling feasibility test conventionally used in EDF or RM can be adopted. The conventional scheduling feasibility test is based on a value of a utilization rate U, which can be calculated as follows.

$$U=\Sigma(C_i/T_i) \; (i=1,\ldots,n)$$

where n is the number of sequences, $C_i$ is a time required in processing individual request in the i-th sequence, and $T_i$ is a period of the i-th sequence.

As shown in FIG. 4, each request of class-1 is registered into class-1 at a start timing of each period, and the deadline is set at an end timing of that period, so that in the case of EDF, the necessary and sufficient condition for guaranteeing the deadline of each request is given by $U \leq 1$. In the case of RM, the sufficient condition for guaranteeing the deadline of each request is given by $U \leq n \times (2^{1/n}-1)$ Note that these conditions presuppose that the interruption is possible for each request. Consequently, using the request dividing method described above, the transfer amount of individual request is made not to exceed a certain prescribed unit amount. Then, a time required in processing individual request is obtained as follows.

C=(the worst possible time required for the media exchange)+(a transfer time required for transferring a unit amount)

Further, the period of the i-th sequence is set to be $T_i'=T_i-C$, and a modified utilization rate U' is calculated as follows.

$$U'=\Sigma(C/T_i') \; (i=1,\ldots,n)$$

Then, the sufficient condition for guaranteeing the deadline of each request is given by $U' \leq 1$ for the case of EDF, or by $U' \leq n \times (2^{1/n}31\;1)$ for the case of RM.

Note that these conditions are just examples of the sufficient conditions, and there are other combinations of periodical request sequences for which the deadline of each request can be guaranteed even when these conditions are not satisfied.

In the case of setting a difference between the class switching time and the deadline to be one period, the values of the period, the class switching time, and the deadline are not independent at a timing of sending the request to the scheduler 103. One of these three values can be uniquely determined if the other two values are known. In the above example, the class switching time is set to the data transfer request at the time setting unit 102, but it is also possible to give a request attached with its period to the scheduler 103, and determine the class switching time at the scheduler 103 from the values of the period and the deadline.

Also, in the case of adopting RM as the scheduling policy for class-1, for example, the deadline is unnecessary in the scheduler 103 after the checking by the periodical request sequence management unit 111 is done, so that it is possible to attach the class switching time and the period to the request at the time setting unit 102 and delete the deadline. It is also possible to attach only the class switching time to the request at the time setting unit 102, and obtain the period at the scheduler 103 by inquiring the periodical request sequence management unit 111. In any case, it is sufficient to enable the scheduler 103 to determine the class switching time.

Next, a method for handling data transfer request without deadline in this embodiment will be described. In this embodiment, the data transfer request without deadline is classified as class-3 which is different from class-1 and class-2. Also, the time setting unit 102 does not set any class switching time to a request for which a deadline is not specified.

At a time of selecting the high priority request at the scheduler 103, the priority order among different classes can be assigned in several ways. The higher priority order can be assigned in an order of class-1, class-3, and class-2, or in an order of class-1, class-2, and class-3. In the case where a response time of the request classified as class-3 is important, the request of class-3 can be given a higher priority than the request of class-2. In the case where the reduction of an amount of mechanical actions in the storage device 106 is important, the request of class-2 can be given a higher priority than the request of class-3.

As for the scheduling policy to be adopted for class-3, there is no need to use information related to time as a key, but the request classified as class-3 will never be raised to class-1, so that it is preferable to use a policy in which the request will not be kept waiting forever.

In the following, the case of simultaneously handling plural sequences of data transfer requests to be processed periodically in a system using a removable disk media exchanger as the storage device to be a target of the data transfer requests will be described as an concrete example of this embodiment.

In the case of this example, the request receiving unit 101 of FIG. 1 receives a registration of the periodical request sequence and individual data transfer requests belonging to that periodical request sequence from the application 105.

The periodical request sequence management unit 111 manages each registered periodical request sequence by storing its identifier, its period, and a deadline of a previous request (to be described below) as one record in the management table 112.

The time setting unit 102 sets the class switching time and the deadline for each received data transfer request by referring to the periodical request sequence management unit 111.

The scheduler 103 includes a request classification unit 113, a class-1 management unit 114, a class-2 management unit 115, and a class switching unit 116.

The request classification unit 113 compares the class switching time of each request with the current time, and classifies that request as class-1 if the current time exceeds the class switching time, or as class-2 otherwise.

The class-1 management unit 114 and the class-2 management unit 115 manage requests classified as class-1 and class-2 respectively, and select executable requests with the highest priority in the respective classes according to the scheduling policies adopted for the respective classes.

The scheduling policy adopted for requests classified as class-1 is EDF. The class-1 management unit 114 is provided with one list in which the requests are concatenated in an order of their deadlines.

The scheduling policy adopted for requests classified as class-2 is a policy in which only requests with respect to a medium already inserted in the drive will be selected as executable. The class-2 management unit 115 is provided with as many lists as the number of storage media in each of which requests with respect to each storage medium are concatenated. The scheduling policy adopted for requests within each list is FIFO.

The class switching unit 116 has a function for raising those requests registered in the class-2 management unit 115 for which the current time has exceeded the class switching time into class-1, and registering them into the class-1 management unit 114 (while deleting them from the class-2 management unit 115). The class switching unit 116 is provided with a list in which nodes indicating pointers to data transfer requests of class-2 are concatenated in an increasing order of their class switching times. A timer 117 is set up such that a timer event occurs at the class switching time of the request at a top of the list.

At a time of selecting the executable requests with higher priority sequentially, the scheduler 103 first inquires whether executable class-1 requests exist or not to the class-1 management unit 114. If they exist, the request with the highest priority among them is selected. If they do not exist, the scheduler 103 inquires whether class-2 requests with respect to a storage medium currently inserted in the drive exist or not to the class-2 management unit 115. If they exist, the request with the highest priority level among them is selected. If they do not exist, it is judged that there is no executable request at that point. Note that this is only an example, and there are other possible examples. For example, when neither the executable class-1 requests nor the executable class-2 requests exist, the request with the earliest class switching time among the class-2 data transfer requests may be selected while carrying out the media exchange to a storage medium which is a target of the selected request, or the request with respect to a storage medium that can be judged as requiring a least amount of actions of mechanical parts for the purpose of the media exchange by some criteria among the class-2 data transfer requests may be selected while carrying out the media exchange to that storage medium.

The storage device control unit 104 controls the media exchange of the media exchanger 106 and the data transfer of the removable disk drive 110 according to commands from the scheduler 103. In addition, the storage device control unit 104 has a media exchanger state information 109 obtained by checking a state of each part of the media exchanger 106, which is used in responding to an inquiry on the media exchanger state from the scheduler 103.

The media exchanger 106 has a number of slots greater than or equal to the number of disks for storing disks, one drive for carrying out the actual data transfer, and an arm for moving a storage medium (disk) between the slots and the drive. Here, the control commands from the storage device control unit 106 at least include a command for moving a medium from a slot to the drive, a command for moving a medium from the drive to a slot, a command for data transfer, and a command for checking a state of each part.

There is also a data storing position management unit 118 which manages a correspondence between a logical position used by the application 105 in referring to data to be transferred and a physical position at which data is actually stored in the storage device 106, in a storing position correspondence table 119. For example, in the case of managing data in units of files, the data storing position management unit 118 has a function for retrieving a medium number of a storage medium on which the data is actually stored and a storing position (sector number, etc.) on that storage medium, according to a file identifier (file name, etc.) and an offset position from a top of the file in which that data are contained.

Note that the data storing position management unit 118 can be in a form of a file system, for example, and it can be provided outside the data transfer request processing device of this embodiment. In such a case, the application 105 can carry out a conversion from the logical position to the physical position of the data by referring to the data storing position management unit 118, and directly describe the physical position of the data in the data transfer request.

In the following, the operation of each element in this embodiment will be described in further detail along a flow of the data transfer request starting from an application which sequentially reads out data from the storage device and consumes data at a constant rate.

This application 105 reserves N buffers 107 for storing data read out by individual data transfer requests, stores read out data into these buffers sequentially, and consumes these read out data. Here, the consumption of data by the application indicates that data are read out from the buffers and then playbacked, displayed, or transferred towards a client connected to this system through a network.

Figure 5:
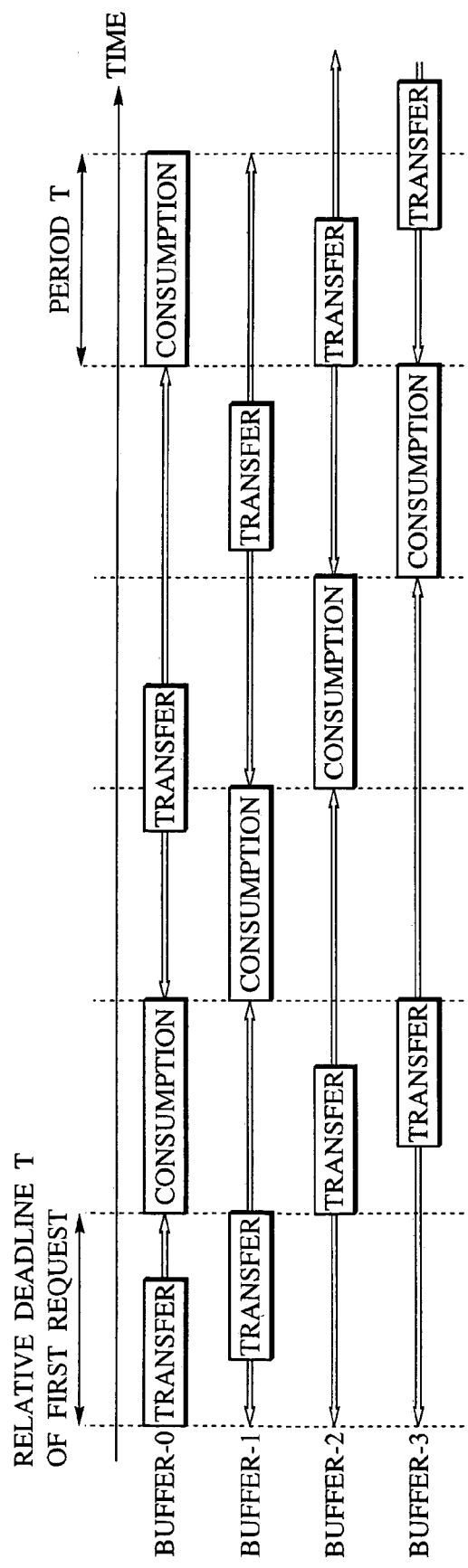
FIG. 5 is a timing chart for data transfer requests and data consumption processing in the case of periodical reading from a storage device in the data storage system of FIG. 1.

FIG. 5 shows a timing chart for the buffer utilization in the case of N=4. By using the buffers in this way, it is possible to consume data continuously at a constant rate.

A period T (sec) of the periodical request sequence is determined from a rate R (byte/sec) at which data are consumed by this application, and an amount of data transferred by individual request. In this embodiment, the amount of data transferred by individual request is set to be a fixed value B (bytes).

First, the application 105 carries out the registration of the periodical request sequence with respect to the request receiving unit 110 at a time of the start of the periodical request sequence. The content to be registered is the period of the periodical request sequence. In the case of the application of this example, it suffices to register the period=T as shown in FIG. 5.

Next, the periodical request sequence management unit 111 assigns an identifier to a new periodical request sequence. Then, this identifier, the period, and a deadline of previous request are added as one record in the management table 112. When individual data transfer requests are issued from the application 105, the periodical request sequence management unit 111 checks the deadline of each data transfer requests. For example, this checking is done by predicting the deadline of a request to be processed next as a time obtained by adding the period to the deadline of the previous request in the periodical request sequence to which this request belongs, and comparing this predicted value with the deadline given from the application. An initial value of the deadline of previous request is set to be the current time at a time of registering the periodical request sequence in this example. After the registration, the assigned identifier is returned to the application 105 through the request receiving unit 101.

The application 105 creates N data transfer requests at a time of the start of the periodical request sequence, and allocates buffers to these data transfer requests. Then, these N data transfer requests are issued to the request receiving unit 101 in the intended data reading order. Then, as shown in FIG. 5, the consumption of data is started at the deadline of the first request, that is one period after the issue time of the first request.

In the transfer request created here, an identifier of the periodical request sequence to which this request belongs, the deadline of this request, a logical position (file identifier, offset position) on the storage device of data to be transferred, and an address of the buffer are described. In this embodiment, the amount of data to be transferred is fixed in the system, so that there is no need to describe this information in individual request.

As can be seen from FIG. 5, as far as the N data transfer requests that are issued together initially are concerned, the deadline can be set to be (i×T+current time) for the i-th data transfer request. As for the subsequent data transfer requests that reuse the buffers after the consumption of the previous data stored in the buffers is completed, the deadline can be set to be ((N−1)×T+issue time of the request).

Figure 6:
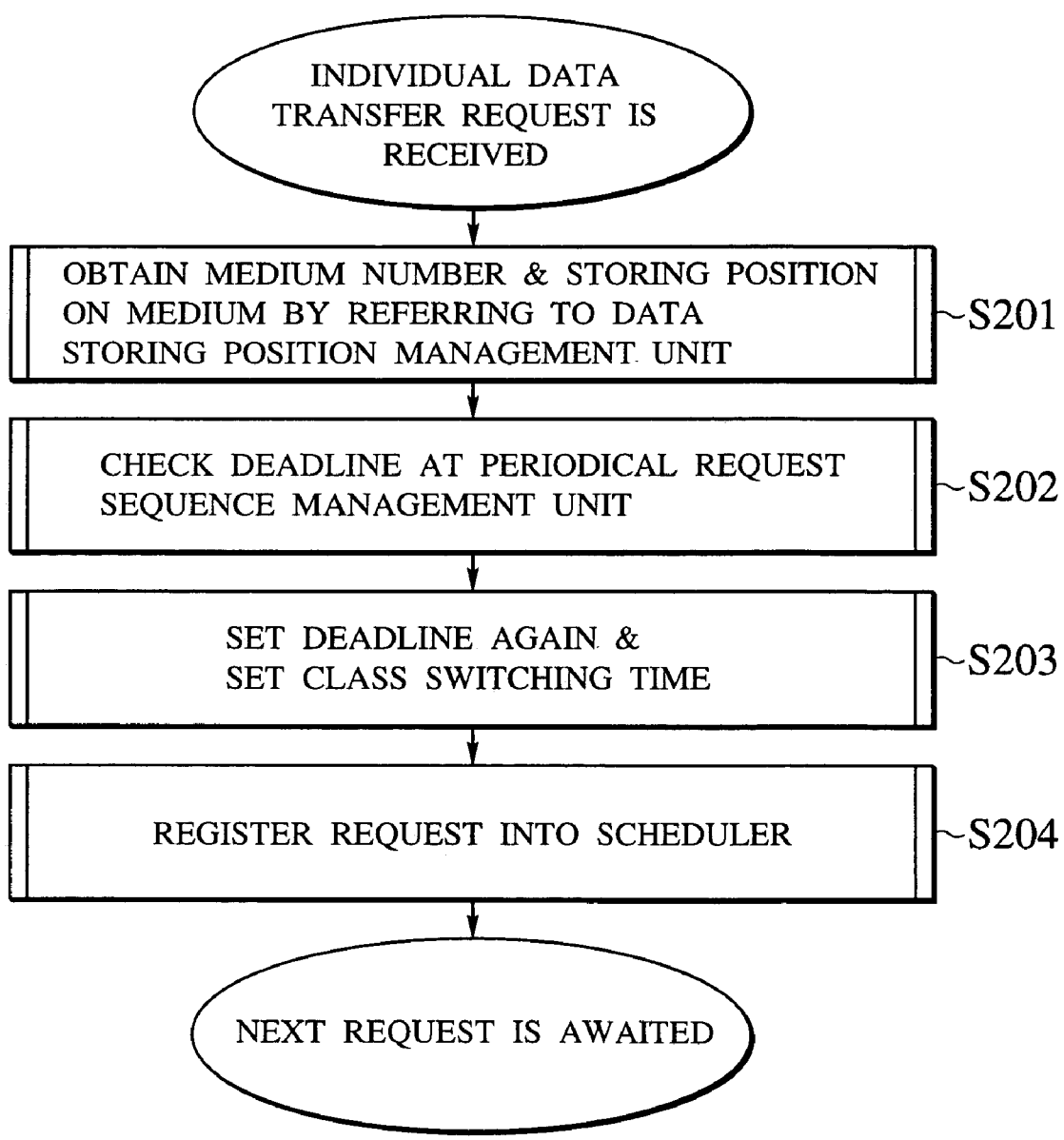
FIG. 6 is a flow chart showing a procedure up to a registration of individual data transfer request into a scheduler in the data storage system of FIG. 1.

Individual data transfer request issued from the application is registered into the scheduler 103 through the request receiving unit 101 and the time setting unit 102. FIG. 6 shows an outline of a procedure for this registration.

When individual data transfer request is received from the application 105, the request receiving unit 101 converts the logical position of the data described in the data transfer request into a physical position (medium number and a storing position on that medium) of the data, by referring to the storing position correspondence table 119 of the data storing position management unit 118 (step S201). Then, the data transfer request is sent to the time setting unit 102.

The time setting unit 102 gives the identifier of the periodical request sequence and the deadline described in the data transfer request to the periodical request sequence management unit 111.

Figure 7:
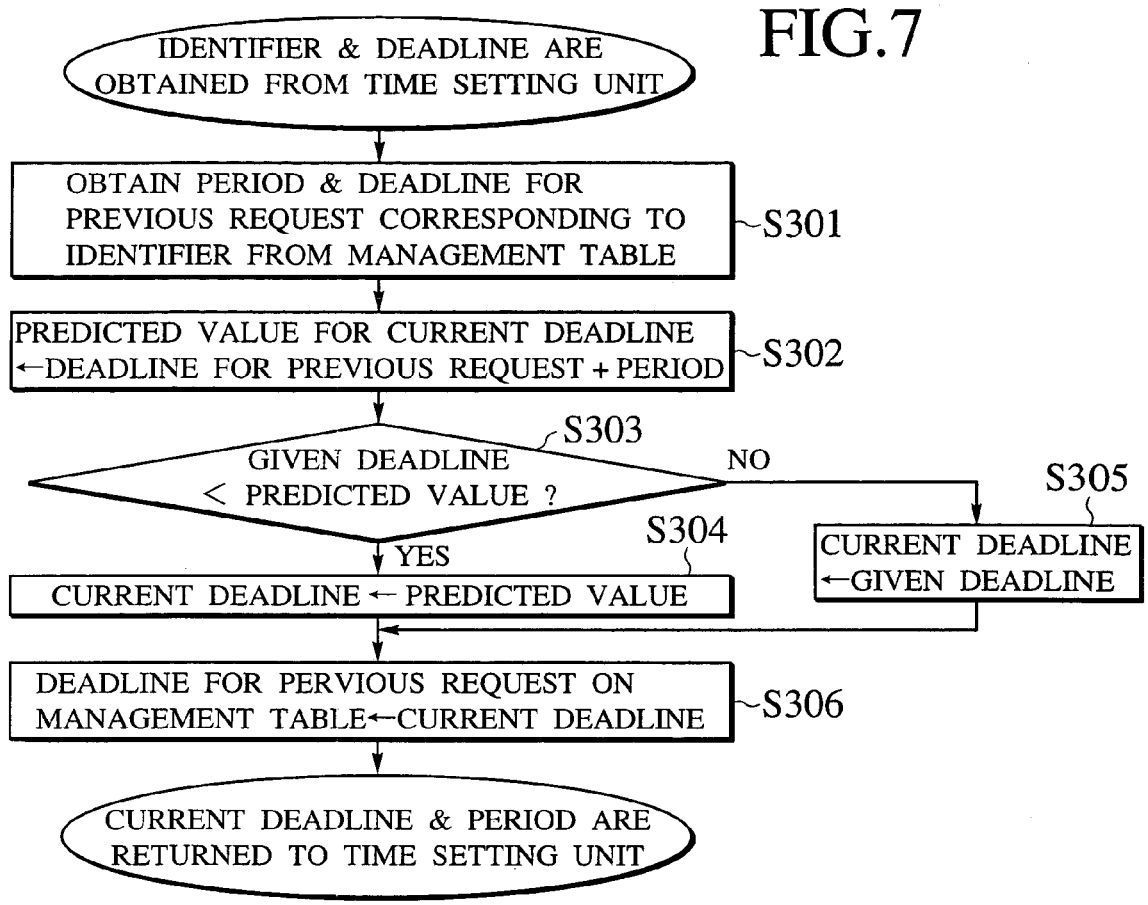
FIG. 7 is a flow chart showing a procedure to check a deadline of a data transfer request at a periodical request sequence management unit in the data storage system of FIG. 1.

The periodical request sequence management unit 111 checks this deadline set by the application, and corrects it if necessary (step S202). A detail of the procedure carried out by the periodical request sequence management unit 111 at this point is shown in FIG. 7.

First, the period of the corresponding periodical request sequence and the deadline of the previous request are obtained using the identifier given from the time setting unit 102 as a key (step S301). Inside the periodical request sequence management unit 111, the predicted value for the deadline of the current request is set to be (deadline of previous request+period) (step S302). The deadline specified from the application is checked according to this predicted value.

Namely, the predicted value for the deadline and the deadline given from the time setting unit 102 are compared, and if the predicted value is greater (step S303 YES), it can be judged that the application is attempting to carry out the data transfer at a period shorter than what was planned. This could cause the erroneous operation, so that the deadline specified by the application and given from the time setting unit 102 is ignored, and the predicted value calculated by the periodical request sequence management unit 111 is set as the deadline of the current request (step S304). On the other hand, if the predicted value is less than the deadline given from the time setting unit 102 (step S303 NO), it can be judged that the application is attempting to carry out the data transfer at a period longer than what was planned. In this example, the request of the application is respected in such a case, so that the predicted value is ignored and the deadline given from the time setting unit 102 is set as the deadline of the current request (step S305).

Then, the management table 112 is updated by setting the above described deadline of the current request as the deadline of previous request (step S306). This deadline of the current request is returned to the time setting unit 102 (in the case of the step S305, the deadline set by the application which is temporarily maintained by the time setting unit 102 is the same as the deadline of the current request so that it is possible to notify that the maintained deadline should be used, instead of returning the deadline here), and the period is given to the time setting unit 102.

Alternatively, it is also possible to modify this operation such that the application does not attach any deadline at all, the time setting unit 102 gives only the identifier of the periodical request sequence to the periodical request sequence management unit 111, and the predicted value for the deadline of the current request calculated by the periodical request sequence management unit 111 at the step S302 is directly returned to the time setting unit 102 as the deadline of the current request.

Figure 8:
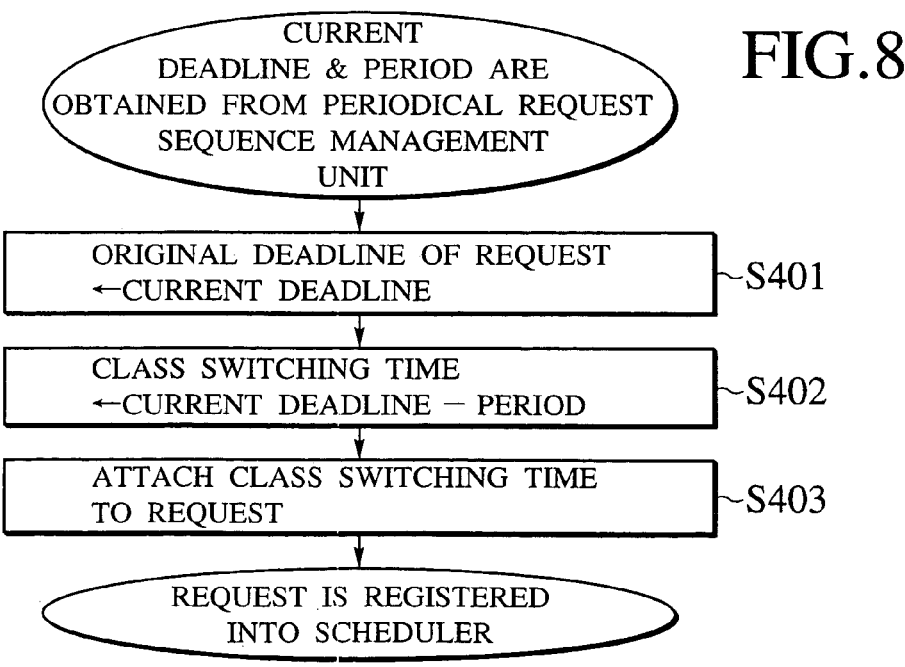
FIG. 8 is a flow chart showing a procedure to set a deadline and a class switching time for a data transfer request at a time setting unit in the data storage system of FIG. 1.

The time setting unit 102 sets the deadline of the data transfer request again, sets the class switching time, and sends this data transfer request to the scheduler 103 (step S203). A detail of the procedure carried out by the time setting unit 102 at this point is shown in FIG. 8.

First, the deadline originally attached to the data transfer request is replaced by the deadline of the current request obtained from the periodical request sequence management unit 111 (step S401). Also, the class switching time is set to be (deadline−period) (step S402). Then, this class switching time is attached to the data transfer request (step S403), and the data transfer request is sent to the scheduler 103.

At this point, the identifier of the periodical request sequence, the deadline, the physical position (medium number, storing position on that medium) of the data to be transferred, the address of the buffer, and the class switching time are described in the data transfer request.

Figure 9:
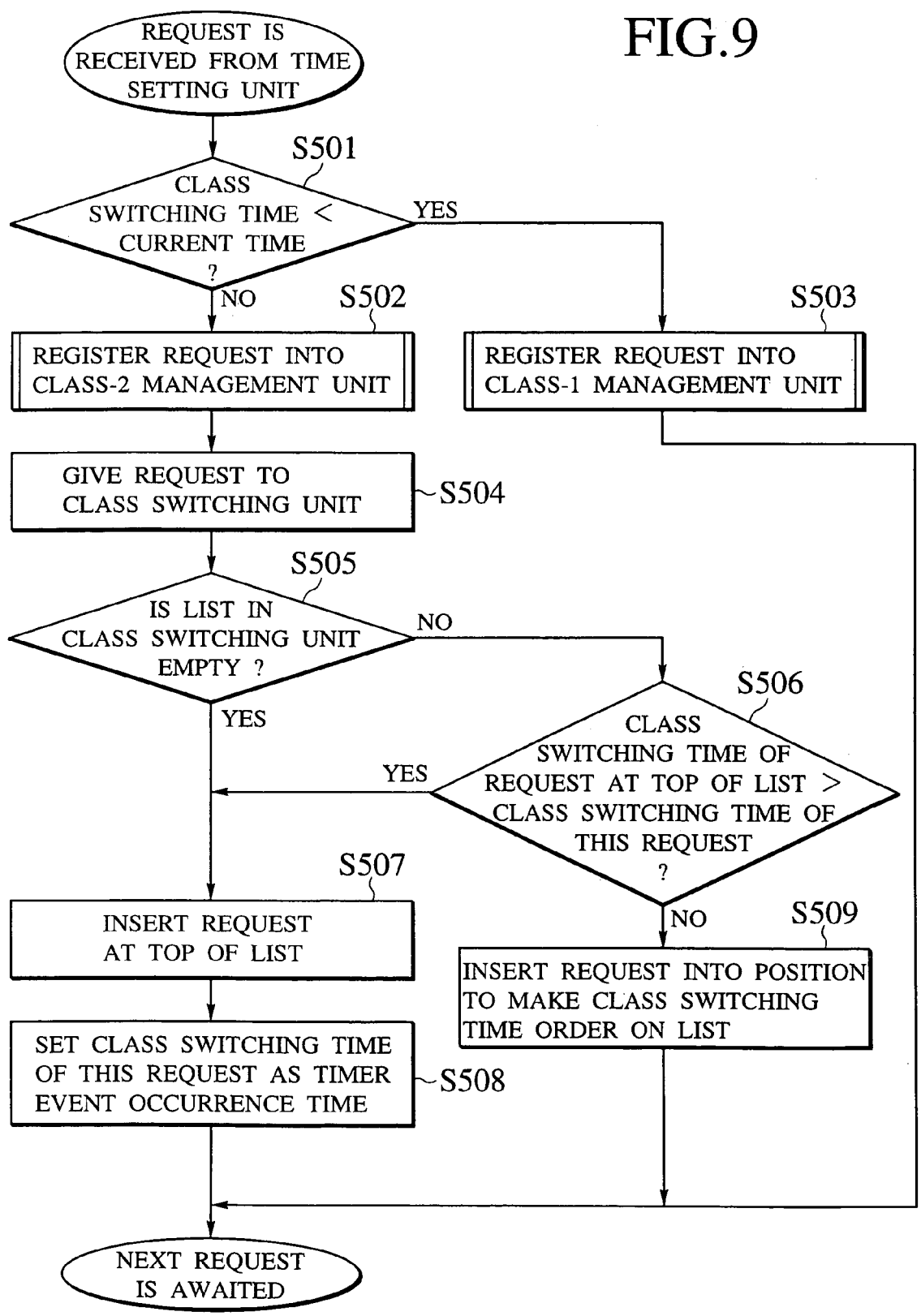
FIG. 9 is a flow chart showing a procedure to register data transfer requests into a class-1 management unit or a class-2 management unit at a scheduler in the data storage system of FIG. 1.

At the scheduler 103, the data transfer request received from the time setting unit 102 is registered (step S204). A detail of the procedure carried out by the scheduler 103 at this point is shown in FIG. 9.

First, the data transfer request received from the time setting unit 102 is classified at the request classification unit 113. Namely, the class switching time contained in the data transfer request is compared with the current time, and if the current time exceeds the class switching time (step S501 YES), the data transfer request is registered into the class-1 management unit 114 (step S502). If the current time does not exceed the class switching time (step S501 NO), the data transfer request is registered into the class-2 management unit 115 (step S502).

At the class-1 management unit 114, the deadline of the request to be newly registered is checked, and the request is concatenated to the list such that the requests are arranged in an order of their deadlines.

At the class-2 management unit 115, the target medium of the request to be newly registered is checked, and the request is concatenated at a bottom of the list corresponding to the target medium.

At a time of registering the data transfer request into the class-2 management unit 115, the data transfer request is also registered into the class switching unit 116 (step S504). When the list of the class switching unit 116 is empty (step S505 YES) or the class switching time of the request to be newly registered is earlier than the class switching time of the request corresponding to the top node (step S506 YES), the node corresponding to the request to be newly registered is inserted at a top of the list (step S507). Then, the timer event occurrence time of the timer 117 is adjusted to the class switching time of this request (step S508). When a request having the class switching time earlier than the class switching time of the request to be newly registered is already registered (step S505 NO and S506 NO), an insertion position to maintain the class switching time order in the list is searched, and the node corresponding to the request to be newly registered is inserted at that position (step S509).

This completes the description of the operation of each element up to the registration of the data transfer request into the scheduler 103. In the following, how the registered data transfer request is handled by the scheduler 103 will be described. Besides the request registration operation described above, the elements constituting the scheduler 103 carry out the following operations.

When the timer event occurs, the class switching unit 116 checks the class switching times of the requests corresponding to the nodes concatenated to the class switching list sequentially from the top of the list. Then, all those requests for which the current time has reached or exceeded the class switching time are deleted from the class-2 management unit 115 and registered into the class-1 management unit 114 instead, while the corresponding nodes are deleted from the list. Then, if the list becomes empty, the timer 117 is set such that the timer event will not occur. If there are nodes remaining in the list, the timer 117 is set to the class switching time of the request corresponding to the top node in the list.

At a time of selecting the highest priority request in class-1, the class-1 management unit 114 selects the request at a top of the list in the deadline order. When no request is concatenated to that list, it is judged that there is no executable request.

At a time of selecting the highest priority request in class-2, the class-2 management unit 115 selects the request at a top of the list corresponding to the specified medium. When no request is concatenated to that list, it is judged that there is no executable request.

Now, in this embodiment, there is a possibility for the request that has been unexecutable until then to become executable, at a timing of any of the following events:

when a new request is registered,
when a request classified as class-2 is raised to class-1,
when the media moving by the media exchanger is finished, or
when the data transfer by the drive of the media exchanger is finished.

For this reason, when any of the above events occurs, the scheduler 103 selects the executable request with the highest priority at that point and commands the operation to the storage device control unit 104.

In this example, the media exchanger has a single drive, so that the scheduler 103 operates according to the flow chart of FIG. 10 as follows.

First, whether the drive of the media exchanger is currently transferring data or not is checked. If it is currently transferring data (step S601 YES), the scheduler 103 goes back to the above described event waiting state again.

Next, the highest priority request is selected at the class-1 management unit 114 as described above (step S602). If the executable request exists (step S603 YES), the medium number of the medium inserted in the drive is inquired to the storage device control unit 104 (step S604), and checks whether the target medium of that request is inserted in the drive or not. If the target medium is inserted (step S605 YES), the data transfer start is commanded to the storage device control unit 104 according to that request (step S606). At this point, this request is deleted from the class-1 management unit 114. Then, the scheduler 103 goes back to the even waiting state again.

If the target medium is not inserted in the drive (step S605 NO), whether the media exchanger is currently moving media (whether the arm is currently in use) or not is inquired to the storage device control unit 104. If it is not currently moving media (step S607 NO), the media exchange is commanded to the storage device control unit 104 (step S608). At this point, this request is not deleted from the class-1 management unit 114 yet. Then, the scheduler 103 goes back to the event waiting state again. (Later on, an event that the media moving for the media exchange commanded here is finished occurs, and the steps S601 to S605 are executed once again, in which case the step S605 becomes YES so that the data transfer for the remaining request can be started.) If it is currently moving media (step S607 YES), the scheduler 103 goes back to the event waiting state again.

When the executable request does not exist at the class-1 management unit 114 (step S603 NO), the highest priority request is selected at the class-2 management unit 115 next. To this end, the medium number of the medium inserted in the drive is inquired to the storage device control unit 104 first (step S609). Then, the highest priority request among the class-2 requests for which this medium is a target is selected (step S610). If the executable request exists (step S611 YES), the data transfer start is commanded to the storage device control unit 104 according to this request (step S612). At this point, this request is deleted from the class-2 management unit 115. Then, the scheduler 103 goes back to the event waiting state again. If the executable request does not exist in the class-2 management unit 115 (step S611 NO), the scheduler 103 goes back to the event waiting state again.

When the command for the media exchange is received from the scheduler 103, the storage device control unit 104 checks whether a medium is inserted in the drive 110 or not. If a medium is inserted, the control command for moving this medium from the drive 110 to the original slot is issued to the media exchanger 106, and notifies the scheduler 103 when the moving is finished. If a medium is not inserted, the control command for moving a medium specified from the scheduler 103 from the slot to the drive 110 is issued to the media exchanger 106, and notifies the scheduler 103 when the moving is finished.

Also, when the command for the data transfer start is received from the scheduler 103, the storage device control unit 104 issues the control command for carrying out the data transfer to the drive 110 of the media exchanger 106, and notifies the scheduler 103 when the data transfer is finished. The finishing of the data transfer is also notified to the application 105 through the request receiving unit 101.

Thereafter, when the processing (consumption) of data read into some buffer 107 is completed and this data becomes unnecessary, the application 105 re-allocates this buffer as a buffer for storing data to be processed at N periods later, and issues a new data transfer request.

Note that, in this embodiment, the similar operations can be carried out for the application 105 which generates (or received from the external) data at a constant rate and sequentially writes data into the storage device 106.

Figure 11:
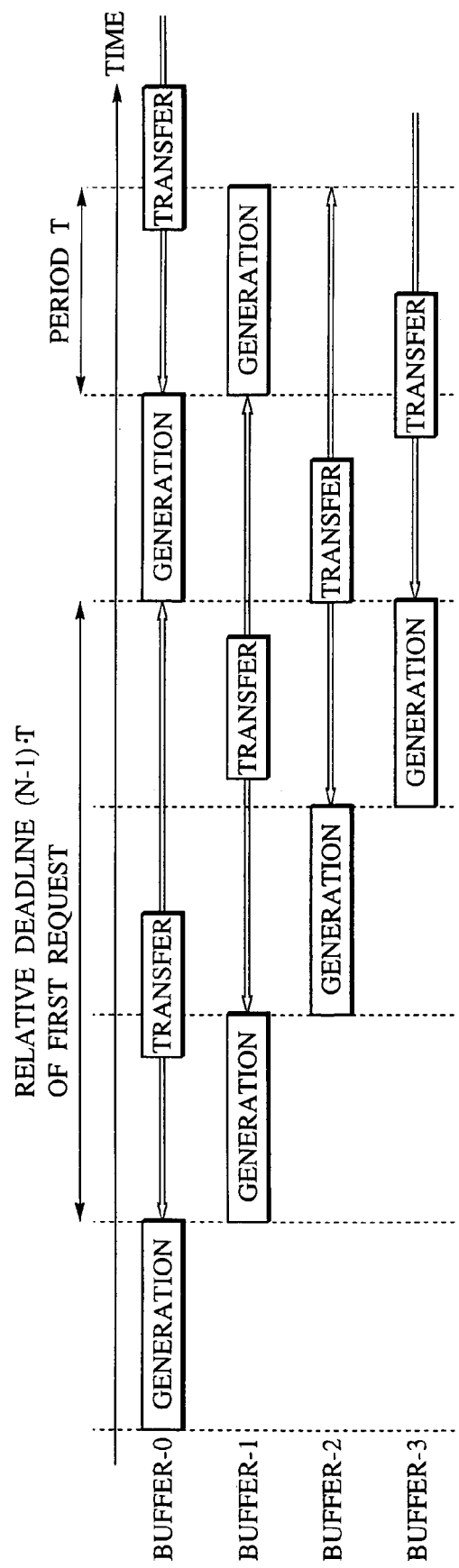
FIG. 11 is a timing chart for data generation and data transfer request processing in the case of periodical writing into a storage device in the data storage system of FIG. 1.

The application 105 reserves N buffers 107 for storing data to be transferred by individual requests, and sequentially generates data, stores data into buffers, and issues the data transfer requests for writing into the storage device 106, as shown in FIG. 11.

After the data transfer request for writing data stored in one buffer 107 (buffer-0, for instance) to the storage device 106 is issued, data are sequentially stored into the other buffers 107 (buffer-1, buffer-2, buffer-3, for instance), and this buffer (buffer-0) will be required next at the (N−1) periods later. Consequently, the deadline of the data transfer request can be specified as ((N−1)×T+current time). The subsequent operations are the similar as in the case of data reading application except that the data transfer is writing rather than reading.

In order to illustrate the effects of this embodiment, an exemplary situation of simultaneously operating three applications for reading data periodically will be considered. It is assumed that the time required for the media exchange is t, and the time required for transferring data of B (bytes) from the storage device is also the same t. It is also assumed that the three applications access files stored in different media at respective periods of 6t, 6t and 11t. In such a situation, the following three schemes are compared.

(a) Conventional scheme, using two buffers, and an amount of data transferred by individual request equal to B (bytes).

(b) Conventional scheme, using two buffers, and an amount of data transferred by individual request equal to 2×B (bytes), in which the period is twice longer than that of (a).

(c) Scheme according to this embodiment of the present invention, using four buffers, and an amount of data transferred by individual request equal to B (bytes).

Figure 12A:
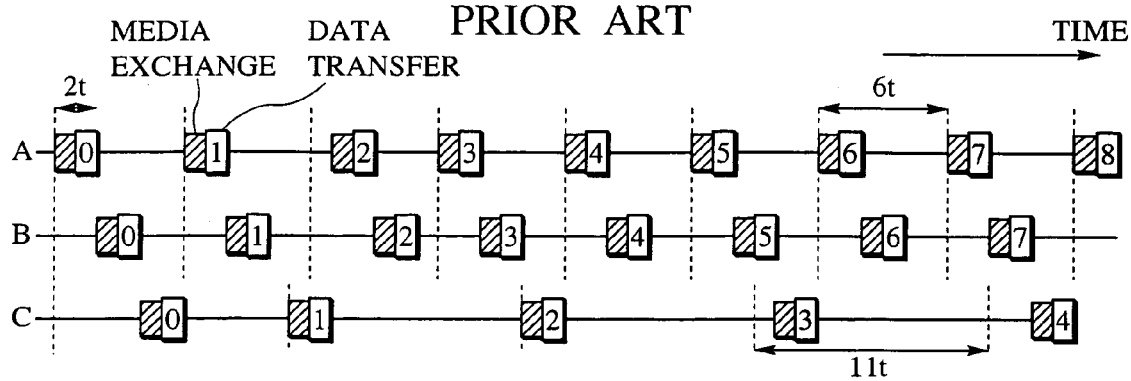
FIGS. 12A, 12B and 12C are timing charts showing exemplary request processing results by two conventional schemes and the present invention scheme in the case of simultaneously operating three applications that issue periodical data transfer requests.
Figure 12B:
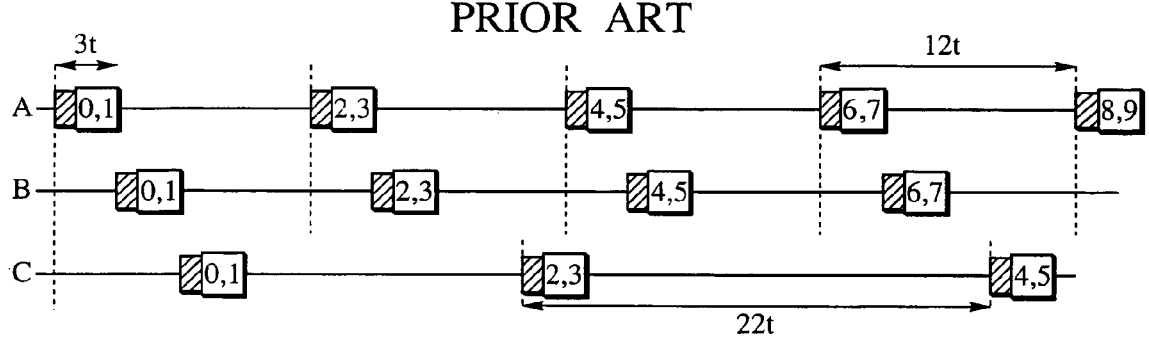
Figure 12C:
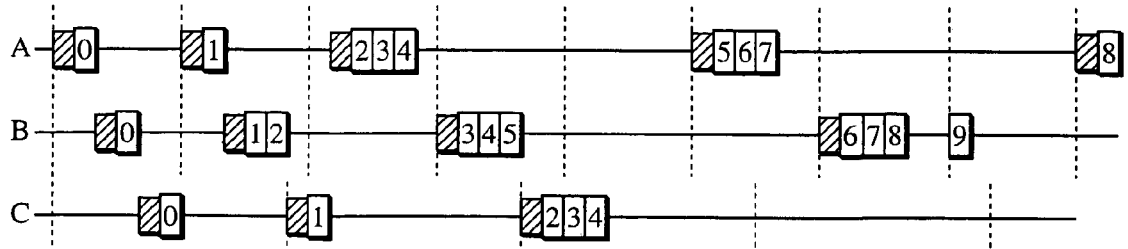

FIGS. 12A, 12B and 12C respectively show the timing charts for the processing according to the above three schemes. On axes labelled A, B and C representing the three applications, black boxes represent the media exchanges, and blank boxes with numbers indicated therein represent the data transfers. The numbers in the blank boxes indicate the transfer order in each application.

As can be seen from FIG. 12, in the processing (c) of this embodiment, all the requests are classified as class-1 at a time of the start of new application, so that the first data of each file is transferred sequentially while carrying out the media exchange similarly as in (a) at first (EDF is used in this example, but the requests are processed in an increasing order of their periods similarly as in the case of using RM accidentally). Thereafter, as the executable class-2 requests are processed during idle times in which there is no executable class-1 request, the period of media exchange gradually becomes longer and the number of media exchanges is gradually decreased.

Namely, when (a) and (c) are compared, the number of media exchanges can be noticeably reduced by increasing the number of buffers in (c).

On the other hand, in (b), the number of media exchanges is less than (a) because the amount of data transfer per request and the period are twice as much as (a), but the waiting time until the data consumption by the reading application starts also becomes twice longer.

When (b) and (c) are compared, the number of media exchanges is less in (c) than (b) at the second half of the stationary operation state. In addition, the actual period of (c) is one half of (b) (equal to (a)), so that the waiting time until the data consumption start is also one half of (b) (equal to (a)). Namely, according to this embodiment, it is possible to reduce the number of media exchanges without increasing the amount of data transfer per request and the period (that is the waiting time).

Note that there is also a scheme which caches only top data of the files in order to make it appear as if there is no waiting time until the data consumption start, but even when such a scheme is employed, the size of each data in (c) can be one half of (b) so that the total cache capacity required for caching the same number of data can be half according to this embodiment.

Next, as a modification of the above embodiment, the operation of the scheduler 103 in an exemplary case where the media exchanger 106 has a plurality of drives 110 will be described.

In this example, when the scheduler 103 is activated as any of the above described four events occurs, a drive state list is created first. This drive state list is a list for indicating an order by which the drives are to be selected as a moving target when there is a need to move a medium from a slot to a drive for the purpose of the data transfer.

In the drive state list, nodes with the drive number and a numerical value indicating a state described therein are concatenated in an order of:

(1) a drive in which no medium is inserted;

(2) a drive in which a medium is inserted but which is not currently transferring data, and there is no request for which this medium is a target; and (3) a drive in which a medium is inserted but which is not currently transferring data, and there is a request for which this medium is a target.

Note that a drive from which a medium is currently moved to a slot, a drive to which a medium is currently moved from a slot, and a drive to which a command for such media moving is already issued will be excluded from the above (1) to (3).

In this example, a plurality of drives are available so that there are cases where more than one class-1 requests are executable simultaneously. For this reason, the class-1 management unit 114 is provided with a function for selecting the executable requests in a decreasing order of their priority at that moment, instead of a function for selecting the highest priority request. Here, however, the selection is made only from those requests whose target media satisfy the condition that "it is inserted in a slot or a drive and it is not currently transferring data". If the above condition is not satisfied, a request will not be selected even if its priority is the highest, and another request with a next highest priority will be searched. Note that while the medium is moving between a slot and a drive, the above condition is to be regarded as not satisfied.

Similarly, for the class-2 requests, a plurality of drives are available so that there are cases where more than one class-2 requests are executable simultaneously. For this reason, the class-2 management unit 115 selects requests from those requests whose target media satisfy the condition that "it is inserted in a drive and it is currently not transferring data". However there is no need to determine the priority order among the requests which have different target media for which the above condition holds. For this reason, the class-2 management unit 115 is provided with a function for specifying a medium that satisfies the above condition and selecting the highest priority request among the class-2 requests with respect to that medium.

Figure 13:
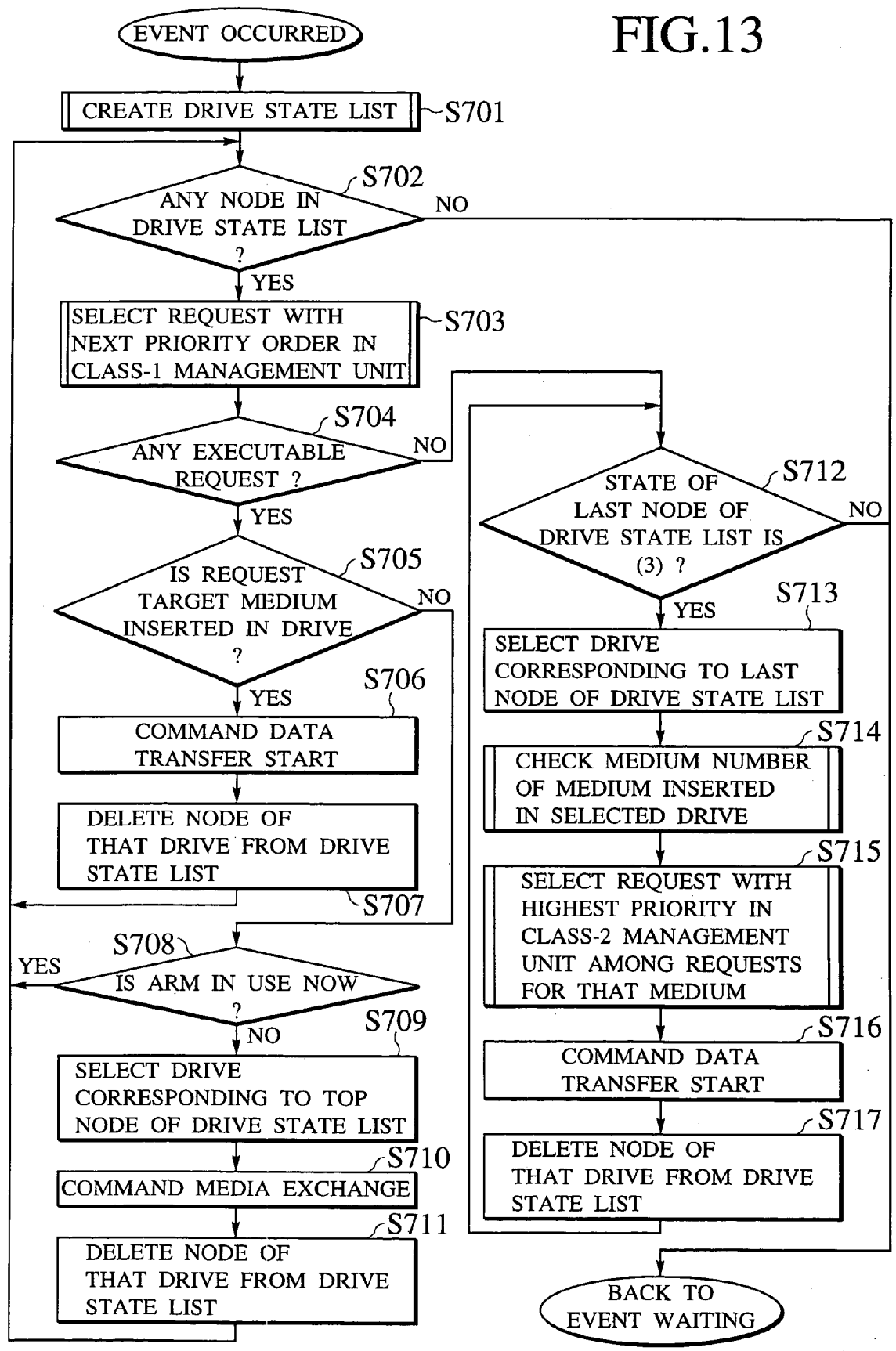
FIG. 13 is a flow chart of an exemplary operation in which a scheduler commands a processing in a decreasing order of priority when a plurality of drives are used in the data storage device of FIG. 1.

FIG. 13 shows the operation of the scheduler 103 in this case involving a plurality of drives. First, the drive state list is created (step S701), and then the processing of the class-1 request is started. If the drive state list is empty (step S702 NO), the scheduler 103 goes back to the event waiting state.

If there are nodes in the drive state list (step S702 YES), the requests are selected in a decreasing order of their priority at the class-1 management unit 114 (step S703). If there is an executable class-1 request (step S704 YES), whether the target medium of this request is inserted in a drive or not is checked. If the target medium is inserted in a drive (step S705 YES), the data transfer start is commanded to the storage device control unit 104 according to this request (step S706). At this point, this request is deleted from the class-1 management unit 114. In addition, a node corresponding to that drive is deleted from the drive state list (step S707). Then, the processing returns to the checking of the drive state list (step S702).

If the target medium is not inserted in a drive (step S705 NO), whether an arm is currently in use (any medium is currently moved) or not is checked. If the arm is currently in use (step S708 YES), the processing returns to the checking of the drive state list (step S702).

If the arm is not currently in use (step S708 NO), a drive corresponding to the top node in the drive state list is selected as a medium moving target drive (step S709). Then, the media exchange for that drive is commanded to the storage device control unit 104 (step S710). At this point, this request is not deleted from the class-1 management unit 114 yet. However, a node corresponding to this drive is deleted from the drive state list (step S711). Then, the processing returns to the checking of the drive state list (step S702).

If there is no executable class-1 request (step S704 NO), the processing of the class-2 request is started. Whether the state of the drive corresponding to the last node of the drive state list is the above described (3), that is "a drive in which a medium is inserted but which is not currently transferring data, and there is a request for which this medium is a target", or not is checked.

If the state is (3) (step S712 YES), this drive is selected (step S713). Then, the medium number of a medium inserted in this selected drive is checked (step S714) and the highest priority request among the class-2 requests with respect to this medium is selected at the class-2 management unit 115 (step S715). Note that the requests with respect to this medium are all class-2 requests, because the data transfer start would have been already commanded at the earlier step if there is any class-1 request.

The data transfer start is commanded to the storage device control unit 104 according to the requested selected at the class-2 management unit 115 (step S716). At this point, this request is deleted from the class-2 management unit 115. In addition, a node corresponding to that drive is deleted from the drive state list (step S717). Then, the processing returns to the checking of the state of the last node in the drive state list (step S712).

If the state of the drive corresponding to the last node in the drive state list is not (3) (step S712 NO) (or if the drive state list is empty), the scheduler 103 goes back to the event waiting state.

Next, as another modification of the above embodiment, the operation of each element in an exemplary case of handling data transfer request without deadline as well will be described.

In the case of handling data transfer request without deadline, the above embodiment can be modified as follows. First, a special identifier for indicating that it is a data transfer request without deadline is provided as the identifier of the periodical request sequence, There is no need for the application 105 to carry out the registration of the periodical request sequence, so that the application specifies the identifier of the periodical request sequence at a time of issuing individual data transfer request. At the request receiving unit 101, it can be ascertained from this identifier that it is the data transfer request without deadline, so that this request is directly sent to the scheduler 103 without sending it to the time setting unit 102.

At the request classification unit 113 of the scheduler 103, the request to which the deadline is not attached is classified as class-3, and registered into a class-3 management unit (not shown).

The scheduling policy adopted for the requests classified as class-3 is FIFO. The class-3 management unit is provided with one list in which the requests are concatenated in their registration order.

Figure 10:
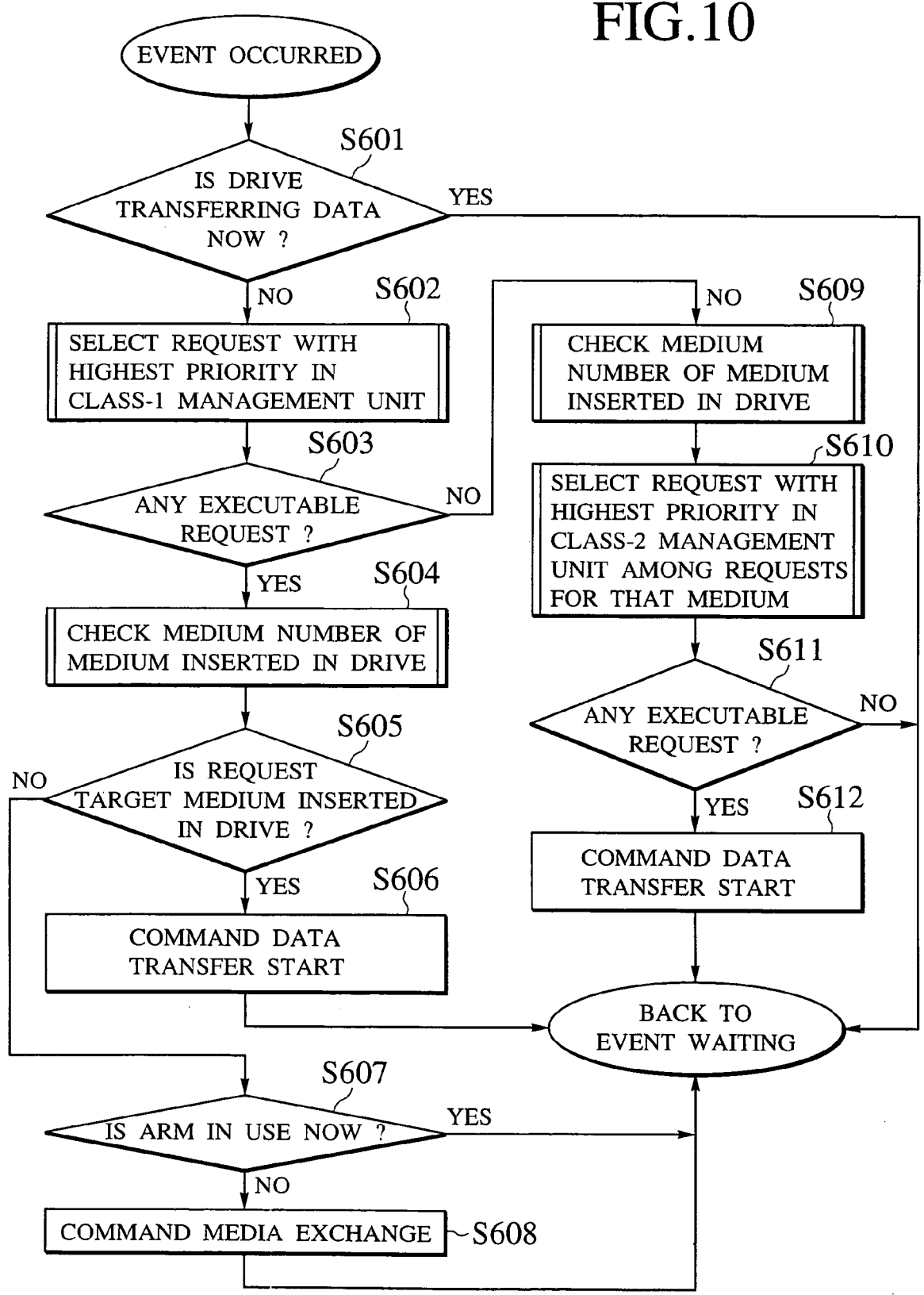
FIG. 10 is a flow chart of an exemplary operation in which a scheduler commands a processing of a highest priority request in the data storage system of FIG. 1.
Figure 14:
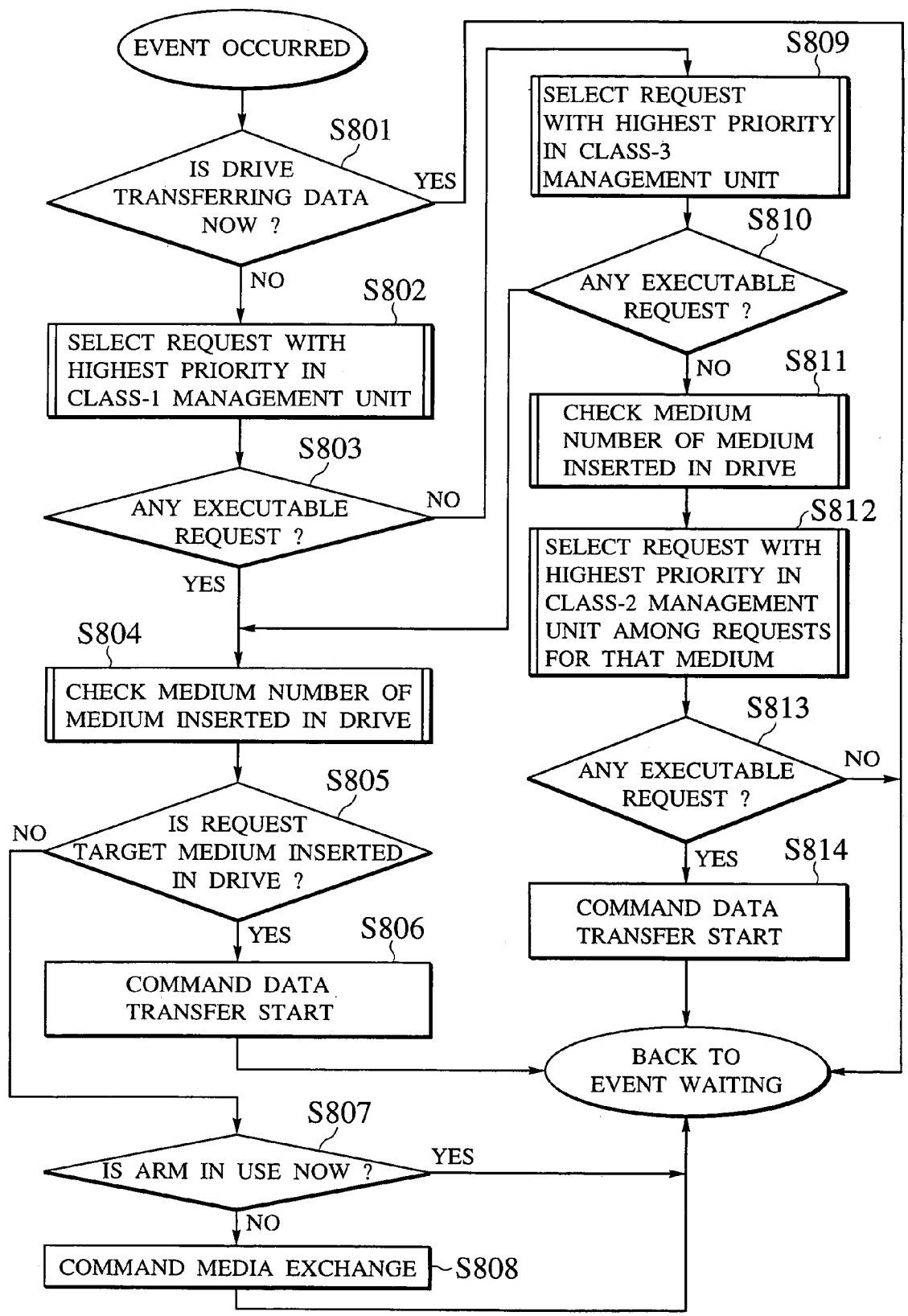
FIG. 14 is a flow chart of an exemplary operation in which a scheduler commands a processing in a decreasing order of priority when requests without deadlines are also handled in the data storage system of FIG. 1.

At a time of selecting the highest priority request at the scheduler 103, the class-3 processing can be added to the processing shown in FIG. 10, according to the priority order among classes. FIG. 14 shows the processing in the case of using the priority order of class-1, class-3, and class-2.

The operations of the steps S801 to S808 in FIG. 14 are the same as the operations of the steps S601 to S608 in FIG. 10, respectively. When there is no executable class-1 request (step S803 NO), the highest priority request among the class-3 requests is selected in this example (step S809). If there is an executable class-3 request (step S810 YES), the operations similar to those for the class-1 request are carried out. Namely, the medium number of a medium inserted in the drive is checked (step S804), and the data transfer is started if the target medium of the request is inserted (step S806), or the media exchange is commanded if the target medium of the request is not inserted (step S808) after confirming that the arm is not currently in use. If there is no executable class-3 request (step S810 NO), the processing of the class-2 request is started, and the operations of the steps S811 to S814 that are similar to the operations of the steps S609 to S612 in FIG. 10 are carried out.

On the other hand, in the case of using the priority order of class-1, class-2, and class-3, the processing of the class-3 request is started when it is judged that there is no executable class-1 or class-2 request at the step S611 in FIG. 10. The highest priority class-3 request is selected, and if the target medium of the selected request is not inserted, the request is processed by carrying out the media exchange. Here, the priority order among the class-3 requests can be the request registration order (FIFO) or such an order that the higher priority is given to those requests whose target medium is currently inserted in the drive.

However, even in the latter case, if it is judged that there is no executable request when there is no request with respect to a medium currently inserted in the drive similarly as for class-2 requests in the above described example, there arises a possibility for some requests to be not processed forever, so that when there is no class-3 request with respect to a medium currently inserted in the drive, another class-3 request should be selected as an executable request.

As described, according to the present invention, when the data transfer requests with deadlines are to be processed, a request for which the current time exceeds the class switching time is classified as class-1 and processed according to the scheduling policy using time as a key such as EDF or RM, even if that requires a processing involving a large amount of mechanical actions such as media exchange. On the other hand, a request for which the current time does not exceed the class switching time is classified as class-2 and processed according to such a policy that this request is not processed even when the drive is in an idling state of not transferring any data, for example, if that requires a processing involving a large mechanical actions such as media exchange.

Consequently, it becomes possible to reduce the number of media exchanges without increasing the period, while guaranteeing the completion of individual data transfer within the deadline by adopting the scheduling policy such as EDF or RM, especially in a system that handles periodical data transfer.

It is to be noted that the above described embodiments can be modified to use a logical time for the deadline and the class switching time.

For example, when the timing of data consumption by the application is accurate, the time taken by the application to consume data of one buffer becomes accurately equal to one period. In such a case, a logical time that is valid only within each periodical request sequence, such as the number of periods since the start of each periodical request sequence, can be used for specifying the deadline and the class switching time. The operation of the data transfer request processing device in the case of using such a logical time is as follows.

First, when the application 105 registers a request, the number of periods since the start of the periodical request sequence is specified as the logical deadline. The time setting unit 102 can then set the logical class switching time=logical deadline−1.

Also, the application 105 issues a notice to the request receiving unit 101 at a boundary of each period. The periodical request sequence management unit 111 counts the number of notices received by the request receiving unit 101 and maintains the number of periods since the start of the corresponding periodical request sequence as a logical current time. Here, the application 105 can issue this notice at a timing for switching buffers from which data are to be consumed.

At the class switching unit 116, those class-2 requests belonging to the corresponding periodical request sequence for which the logical current time exceeds the logical class switching time are raised into class-1 at a timing of arrival of this notice. Consequently, the class switching unit 116 does not require the timer setting operation because this notice is utilized instead of the timer event.

In the case where the scheduling policy of the class-1 management unit 114 is a policy based on the deadline such as EDF, the start time of the periodical request sequence should be maintained such that the absolute deadline can be calculated as: absolute deadline=start time+logical deadline×periods.

As a further modification, the application 105 may issue a notice at a boundary of each period only when the number of remaining buffers available for the data consumption is less than or equal to 1. In this case, at the class switching unit 116, a request which has the earliest deadline among the class-2 requests belonging to the periodical request sequence that corresponds to the notice is raised to class-1.

Thus the deadline and the class switching time mentioned in the above embodiments and the appended claims should be construed as covering not only the deadline and the class switching time given in terms of absolute times but also the deadline and the class switching time given in terms of logical times.

It is also to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, the data transfer request processing device of the above described embodiments can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method for processing data transfer requests with respect to a storage device that requires mechanical actions in carrying out data transfers, comprising:

sequentially accepting the data transfer requests;

setting, if each accepted data transfer request is accompanied with a deadline for completing a requested data transfer, a time earlier than the deadline as a corresponding class switching time for the accompanied data transfer request;

repeatedly checking whether a current time has exceeded the corresponding class switching time of each accepted data transfer request and classifying each accepted data transfer request into a first class when the current time has already exceeded the corresponding class switching time and each accepted data transfer request into a second class when the current time has not yet exceeded the corresponding class switching time;

scheduling processing of first class data transfer requests that are classified as the first class by the classifying step according to a first scheduling policy in which a completion of data transfers requested by the data transfer requests within the deadlines specified for the data transfer requests is a primary key factor in determining an order of processing, and scheduling processing of second class data transfer requests that are classified as the second class by the classifying step according to a second scheduling policy in which a reduction of amounts of the mechanical actions required in carrying out data transfers requested by the data transfer requests is a primary key factor in determining an order of processing; and processing the data transfer requests according to a scheduling result obtained by the scheduling step so as to control the storage device to carry out data transfers requested by the data transfer requests.

2. The method of claim 1, wherein the scheduling step comprises:

scheduling a processing of each first class data transfer request such that a data transfer requested by each first class data transfer request is guaranteed to be completed within a deadline specified for each first class data transfer request, regardless of an amount of the mechanical actions required in carrying out the data transfer requested by each first class data transfer request.

3. The method of claim 1, wherein the scheduling step comprises:

scheduling a processing of each second class data transfer request such that each second class data transfer request will not be processed if a prescribed condition regarding an amount of the mechanical actions required in carrying out a data transfer requested by each second class data transfer request is not satisfied.

4. The method of claim 3, wherein the prescribed condition is that a data transfer requested by each second class data transfer request does not require a media exchange in the storage device.

5. The method of claim 1, wherein the processing step comprises:

processing the first class data transfer requests at a higher priority that the second class data transfer requests.

6. The method of claim 1, wherein the data transfer requests include a series of data transfer requests constituting a periodical request sequence to be processed periodically at a prescribed period, and the setting step comprises setting a time which is earlier than a deadline of each data transfer request by one prescribed period time as the class switching time for each data transfer request belonging to the periodical request sequence.

7. The method of claim 6, wherein the data transfer requests include a plurality of periodical request sequences, and the scheduling step comprises scheduling a processing of the first class data transfer requests such that the first class data transfer requests belonging to a periodical request sequence having a shorter prescribed period than other periodical request sequences are processed at a higher priority than the first class data transfer requests belonging to the other periodical request sequences.

8. The method of claim 1, wherein the scheduling step comprises:

scheduling processing of the first class data transfer requests such that a first class data transfer request having an earlier deadline than other first class data transfer requests is processed at a higher priority than the other first class data transfer requests.

9. The method of claim 1, wherein the scheduling step comprises:

scheduling a processing of the first class data transfer requests such that at least one of an amount of movement of a storage medium in the storage device, an amount of movement of a head to access a storage medium in the storage device, and a number of media exchanges in the storage device that are required in carrying out data transfers requested by the data transfer requests is reduced.

10. The method of claim 1, wherein the classifying step comprises classifying data transfer requests that are not accompanied with deadlines as third class data transfer requests, and the scheduling step comprises scheduling a processing of the data transfer requests such that the first class data transfers are processed at a higher priority than the third class data transfer requests, and the third class data transfer requests are processed at a higher priority than the second class data transfer requests.

11. The method of claim 1, wherein the classifying step comprises classifying data transfer requests that are not accompanied with deadlines as third class data transfer requests, and the scheduling step comprises scheduling a processing of the data transfer requests such that the first class data transfers are processed at a higher priority than the second class data transfer requests, and the second class data transfer requests are processed at a higher priority than the third class data transfer requests.

12. The method of claim 11, wherein the scheduling step comprises:

scheduling a processing of each third class data transfer request such that each third class data transfer request has a possibility for being processed even if a prescribed condition regarding an amount of the mechanical actions required in carrying out a data transfer requested by each third class data transfer request is not satisfied.

13. A data transfer request processing device for processing data transfer requests with respect to a storage device that requires mechanical actions in carrying out data transfers, comprising:

an accepting unit configured to sequentially accept the data transfer requests;

a time setting unit configured to set, if each accepted data transfer request is accompanied with a deadline for completing a requested data transfer, a time earlier than the deadline as a corresponding class switching time for the accompanied data transfer request;

a classifying unit configured to repeatedly check whether a current time has exceeded the corresponding class switching time of each accepted data transfer request and to classify each accepted data transfer request into a first class when the current time has already exceeded the corresponding class switching time and to classify each accepted data transfer request into a second class when the current time has not yet exceeded the corresponding class switching time;

a scheduling unit configured to schedule a processing of first class data transfer requests that are classified as the first class by the classifying unit according to a first scheduling policy in which a completion of data transfers requested by the data transfer requests within the deadlines specified for the data transfer requests is a primary key factor in determining an order of a processing, and to schedule a processing of second class data transfer requests that are classified as the second class by the classifying unit according to a second scheduling policy in which a reduction of amounts of the mechanical actions required in carrying out data transfers requested by the data transfer requests is a primary key factor in determining an order of processing; and a processing unit configured to process the data transfer requests according to a scheduling result obtained by the scheduling unit so as to control the storage device to carry out data transfers requested by the data transfer requests.

14. The data transfer request processing device of claim 13, wherein the scheduling unit schedules a processing of each first class data transfer request such that a data transfer requested by each first class data transfer request is guaranteed to be completed within a deadline specified for each first class data transfer request, regardless of an amount of the mechanical actions required in carrying out the data transfer requested by each first class data transfer request.

15. The data transfer request processing device of claim 13, wherein the scheduling unit schedules a processing of each second class data transfer request such that each second class data transfer request will not be processed if a prescribed condition regarding an amount of the mechanical actions required in carrying out a data transfer requested by each second class data transfer request is not satisfied.

16. The data transfer request processing device of claim 15, wherein the prescribed condition is that a data transfer requested by each second class data transfer request does not require a media exchange in the storage device.

17. The data transfer request processing device of claim 13, wherein the processing unit processes the first class data transfer requests at a higher priority that the second class data transfer requests.

18. The data transfer request processing device of claim 13, wherein the data transfer requests include a series of data transfer requests constituting a periodical request sequence to be processed periodically at a prescribed period, and the time setting unit sets a time which is earlier than a deadline of each data transfer request by one prescribed period time as the class switching time for each data transfer request belonging to the periodical request sequence.

19. The data transfer request processing device of claim 18, wherein the data transfer requests include a plurality of periodical request sequences, and the scheduling unit schedules a processing of the first class data transfer requests such that the first class data transfer requests belonging to a periodical request sequence having a shorter prescribed period than other periodical request sequences are processed at a higher priority than the first class data transfer requests belonging to the other periodical request sequences.

20. The data transfer request processing device of claim 13, wherein the scheduling unit schedules a processing of the first class data transfer requests such that a first class data transfer request having an earlier deadline is processed at a higher priority than other first class data transfer requests.

21. The data transfer request processing device of claim 13, wherein the scheduling unit schedules a processing of the first class data transfer requests such that at least one of an amount of movement of a storage medium in the storage device, an amount of movement of a head to access a storage medium in the storage device, and a number of media exchanges in the storage device that are required in carrying out data transfers requested by the data transfer requests is reduced.

22. The data transfer request processing device of claim 13. wherein the classifying unit also classifies data transfer requests that are not accompanied with deadlines as third class data transfer requests, and the scheduling unit schedules a processing of the data transfer requests such that the first class data transfers are processed at a higher priority than the third class data transfer requests, and the third class data transfer requests are processed at a higher priority than the second class data transfer requests.

23. The data transfer request processing device of claim 13, wherein the classifying unit also classifies data transfer requests that are not accompanied with deadlines as third class data transfer requests, and the scheduling step schedules processing of the data transfer requests such that the first class data transfers are processed at a higher priority than the second class data transfer requests, and the second class data transfer requests are processed at a higher priority than the third class data transfer requests.

24. The data transfer request processing device of claim 23, wherein the scheduling unit schedules a processing of each third class data transfer request such that each third class data transfer request has a possibility for being processed even if a prescribed condition regarding an amount of the mechanical actions required in carrying out a data transfer requested by each third class data transfer request is not satisfied.

25. A computer usable medium having computer readable program codes embodied therein for causing a computer to function as a data transfer request processing device for processing data transfer requests with respect to a storage device that requires mechanical actions in carrying out data transfers, the computer readable program codes comprising:

a first computer readable program code for causing said computer to sequentially accept the data transfer requests;

a second computer readable program code for causing said computer to set, if each accepted data transfer request is accompanied with a deadline for completing a requested data transfer, a time earlier than the deadline as a corresponding class switching time for the accompanied data transfer request;

a third computer readable program code for causing said computer to repeatedly check whether a current time has exceeded the corresponding class switching time of each accepted data transfer request and to classify each accepted data transfer request into a first class when the current time has already exceeded the corresponding class switching time and to classify each accepted data transfer request into a second class when the current time has not yet exceeded the corresponding class switching time;

a fourth computer readable program code for causing said computer to schedule processing of first class data transfer requests that are classified as the first class by the third computer readable program code according to a first scheduling policy in which a completion of data transfers requested by the data transfer requests within the deadlines specified for the data transfer requests is a primary key factor in determining an order of processing, and to schedule processing of second class data transfer requests that are classified as the second class by the third computer readable program code according to a second scheduling policy in which a reduction of amounts of the mechanical actions required in carrying out data transfers requested by the data transfer requests is a primary key factor in determining an order of processing; and a fifth computer readable program code for causing said computer to process the data transfer requests according to a scheduling result obtained by the fourth computer readable program code so as to control the storage device to carry out data transfers requested by the data transfer requests.

26. A data storage system, comprising:

a storage device that requires mechanical actions in carrying out data transfers;

an accepting unit configured to sequentially accept the data transfer requests;

a time setting unit configured to set, if each accepted data transfer request is accompanied with a deadline for completing a requested data transfer, a time earlier than the deadline as a corresponding class switching time for the accompanied data transfer request;

a classifying unit configured to repeatedly check whether a current time has exceeded the corresponding class switching time of each accepted data transfer request and to classify each accepted data transfer request into a first class when the current time has already exceeded the corresponding class switching time and to classify each accepted data transfer request into a second class when the current time has not yet exceeded the corresponding class switching time;

a scheduling unit configured to schedule a processing of first class data transfer requests that are classified as the first class by the classifying unit according to a first scheduling policy in which a completion of data transfers requested by the data transfer requests within the deadlines specified for the data transfer requests is a primary key factor in determining an order of processing, and to schedule a processing of second class data transfer requests that are classified as the second class by the classifying unit according to a second scheduling policy in which a reduction of amounts of the mechanical actions required in carrying out data transfers requested by the data transfer requests is a primary key factor in determining an order of processing; and a processing unit configured to process the data transfer requests according to a scheduling result obtained by the scheduling unit so as to control the storage device to carry out data transfers requested by the data transfer requests.

* * * * *